United States Patent
Sade et al.

(10) Patent No.: US 12,547,149 B2
(45) Date of Patent: Feb. 10, 2026

(54) SYSTEM AND METHOD FOR PRINTING A THREE-DIMENSIONAL OBJECT USING A MODIFIED MESH FILE

(71) Applicant: STRATASYS LTD., Rehovot (IL)

(72) Inventors: Yariv Sade, Kibbutz Maagan Michael (IL); Shai Lipowitch, Petach Tikva (IL); Shai Waisel, Petach Tikva (IL)

(73) Assignee: STRATASYS LTD., Rehovot (IL)

( * ) Notice: Subject to any disclaimer, the term of this patent is extended or adjusted under 35 U.S.C. 154(b) by 551 days.

(21) Appl. No.: 17/927,885

(22) PCT Filed: May 25, 2021

(86) PCT No.: PCT/IL2021/050616
§ 371 (c)(1),
(2) Date: Nov. 27, 2022

(87) PCT Pub. No.: WO2021/240517
PCT Pub. Date: Dec. 2, 2021

(65) Prior Publication Data
US 2023/0205171 A1    Jun. 29, 2023

Related U.S. Application Data

(60) Provisional application No. 63/029,906, filed on May 26, 2020.

(51) Int. Cl.
*G05B 19/4099* (2006.01)
*B33Y 50/00* (2015.01)
(Continued)

(52) U.S. Cl.
CPC .......... *G05B 19/4099* (2013.01); *B33Y 50/00* (2014.12); *G06T 7/13* (2017.01);
(Continued)

(58) Field of Classification Search
CPC ...... G05B 19/4099; G05B 2219/35117; G05B 2219/49023; B33Y 50/00; G06T 7/13;
(Continued)

(56) References Cited

U.S. PATENT DOCUMENTS 11,756,266 B1 *   9/2023  Wang .................... G06T 17/20
                                                             703/2
2017/0061036 A1 *  3/2017  Schmidt ................. G06F 30/20
                                    (Continued)

FOREIGN PATENT DOCUMENTS

EP          3 466 646       4/2019
WO     WO 2015/042422      3/2015
                                    (Continued)

OTHER PUBLICATIONS

International Search Report dated Oct. 6, 2021 for corresponding PCT Application No. PCT/IL2021/050616.

*Primary Examiner* — Rami R Okasha
(74) *Attorney, Agent, or Firm* — PEARL COHEN ZEDEK LATZER BARATZ LLP

(57) ABSTRACT

A system and method of printing a three-dimensional (3D) object may include: receiving an original mesh file of a 3D object, said mesh file comprising a primary mesh data element, representing a respective primary mesh, defined by a plurality of polygons; identifying at least one target design element, associated with the primary mesh; producing at least one auxiliary mesh, based on a geometry of said at least one identified target design element; creating a modified mesh file comprising the primary mesh and the at least one auxiliary mesh; and printing the 3D object based on the modified mesh file.

13 Claims, 18 Drawing Sheets

(51) Int. Cl.
*G06T 7/13* (2017.01)
*G06T 17/20* (2006.01)
*G06T 19/20* (2011.01)

(52) U.S. Cl.
CPC .......... *G06T 17/205* (2013.01); *G06T 19/20* (2013.01); *G05B 2219/35117* (2013.01); *G05B 2219/49023* (2013.01); *G06T 2200/04* (2013.01); *G06T 2219/2021* (2013.01)

(58) Field of Classification Search
CPC ... G06T 17/205; G06T 19/20; G06T 2200/04; G06T 2219/2021
See application file for complete search history.

(56) References Cited

U.S. PATENT DOCUMENTS

| | | | |
|---|---|---|---|
| 2018/0093419 | A1 | 4/2018 | Lappas et al. |
| 2019/0147649 | A1* | 5/2019 | Brochu .............. G06T 19/20 |
| | | | 345/420 |
| 2019/0179288 | A1* | 6/2019 | Wike .............. B29C 64/386 |
| 2019/0210288 | A1* | 7/2019 | Elber .............. G06T 19/20 |

FOREIGN PATENT DOCUMENTS

| | | |
|---|---|---|
| WO | WO 2017/053101 | 3/2017 |
| WO | WO 2019/177606 | 9/2019 |
| WO | WO 2020/006468 | 1/2020 |

* cited by examiner

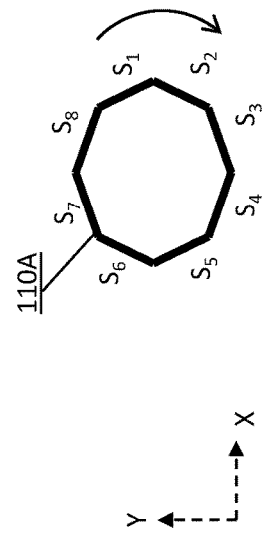
Fig. 7D
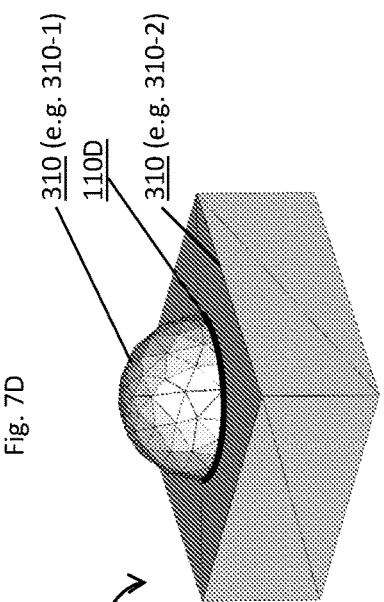
Fig. 7E
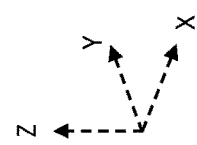
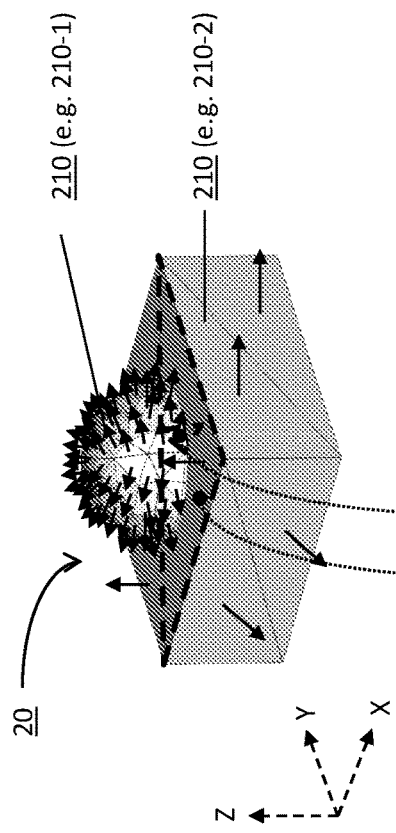
Fig. 7A
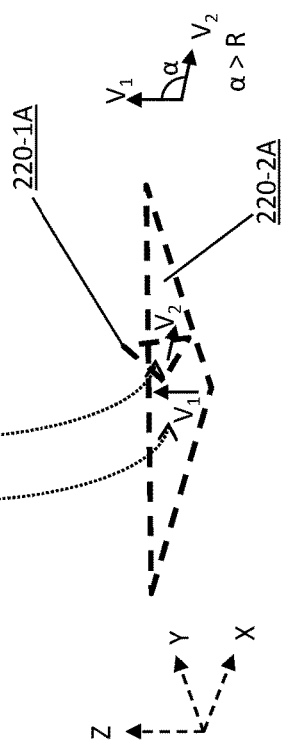
Fig. 7B
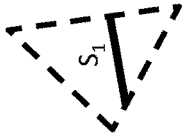
Fig. 7C

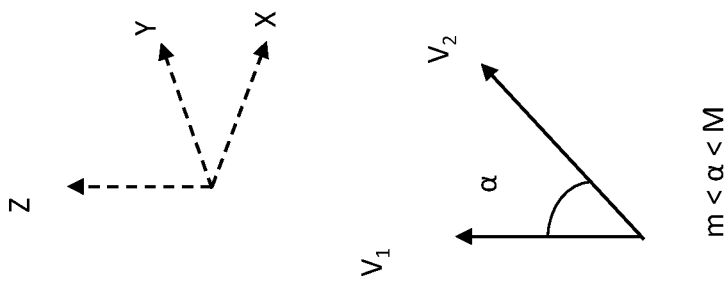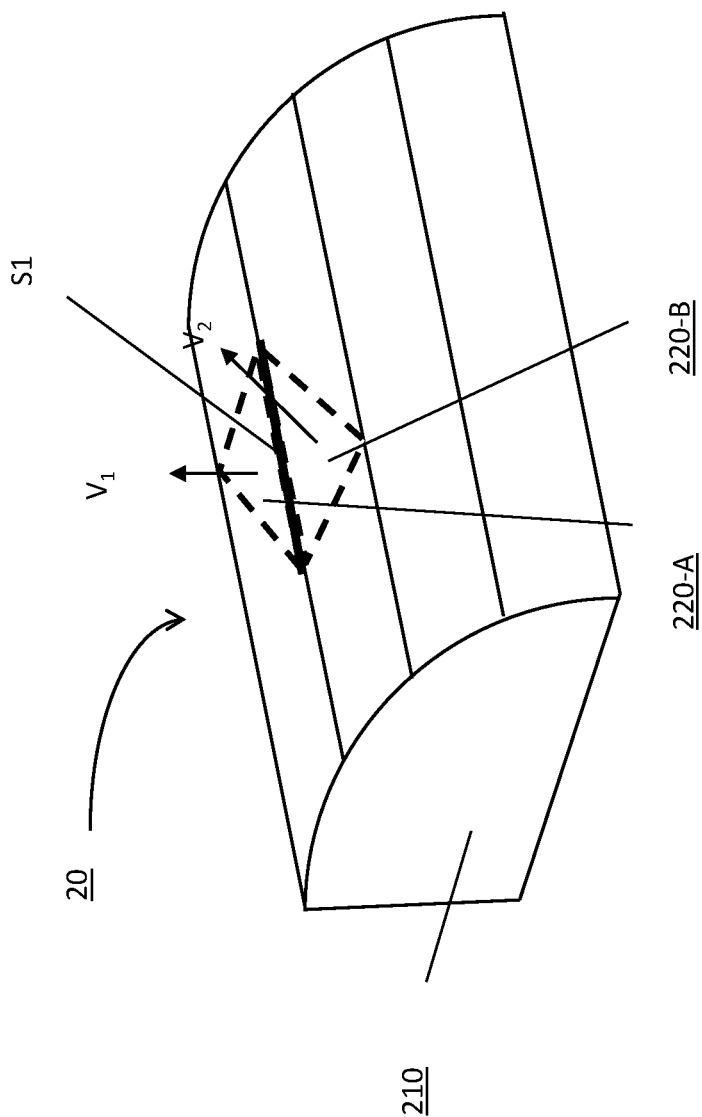
Fig. 8

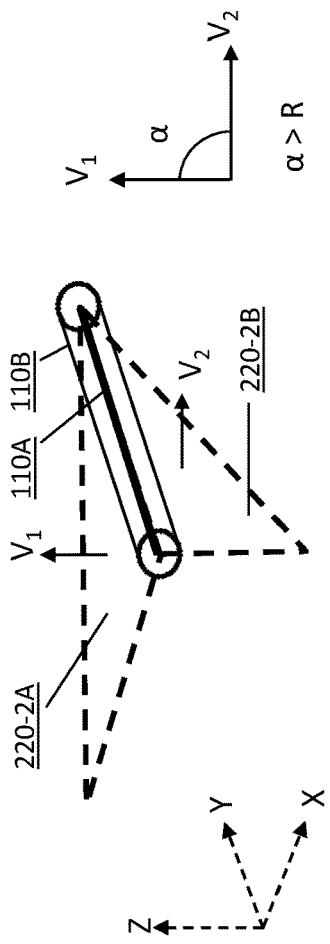
Fig. 9A
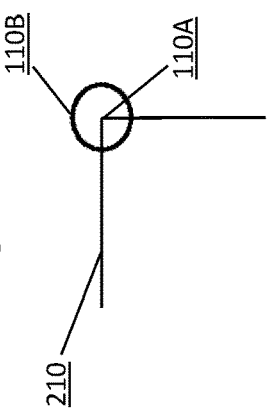
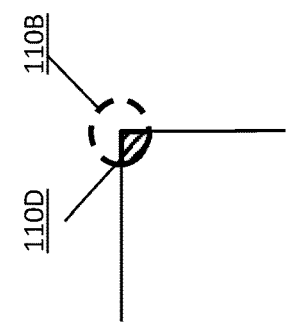
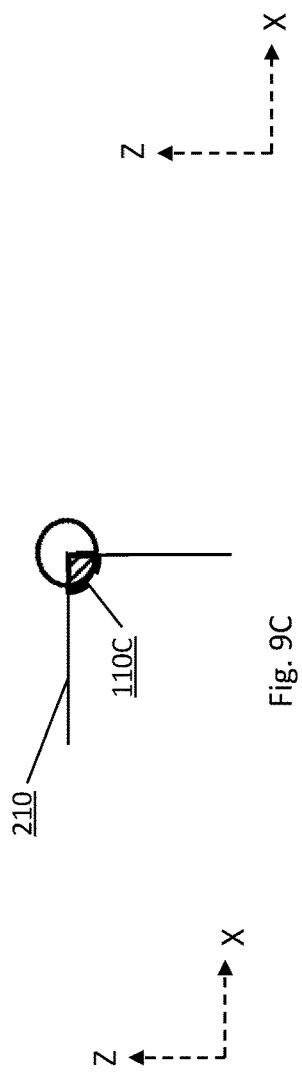
Fig. 9B
Fig. 9C
Fig. 9D
Fig. 9E

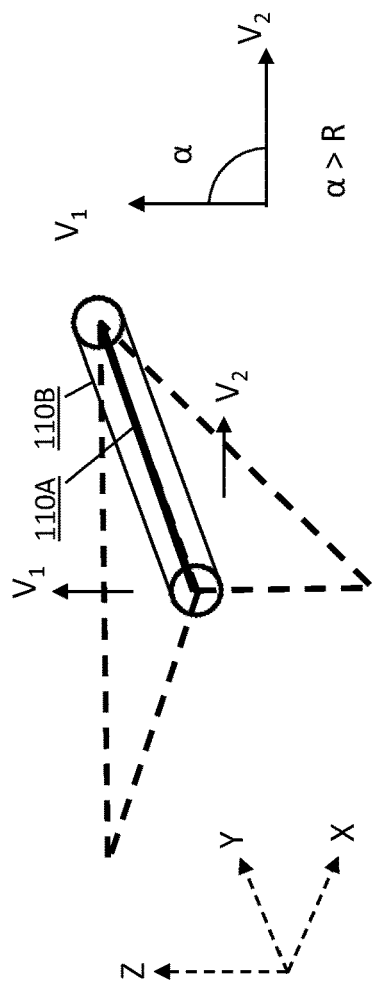
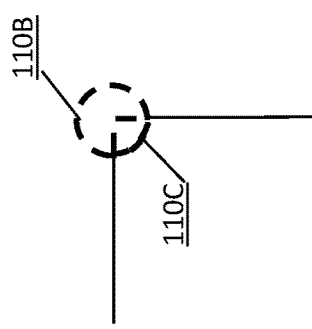
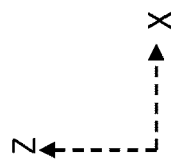
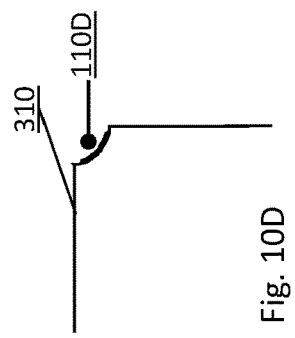
Fig. 10A
Fig. 10B
Fig. 10C
Fig. 10D

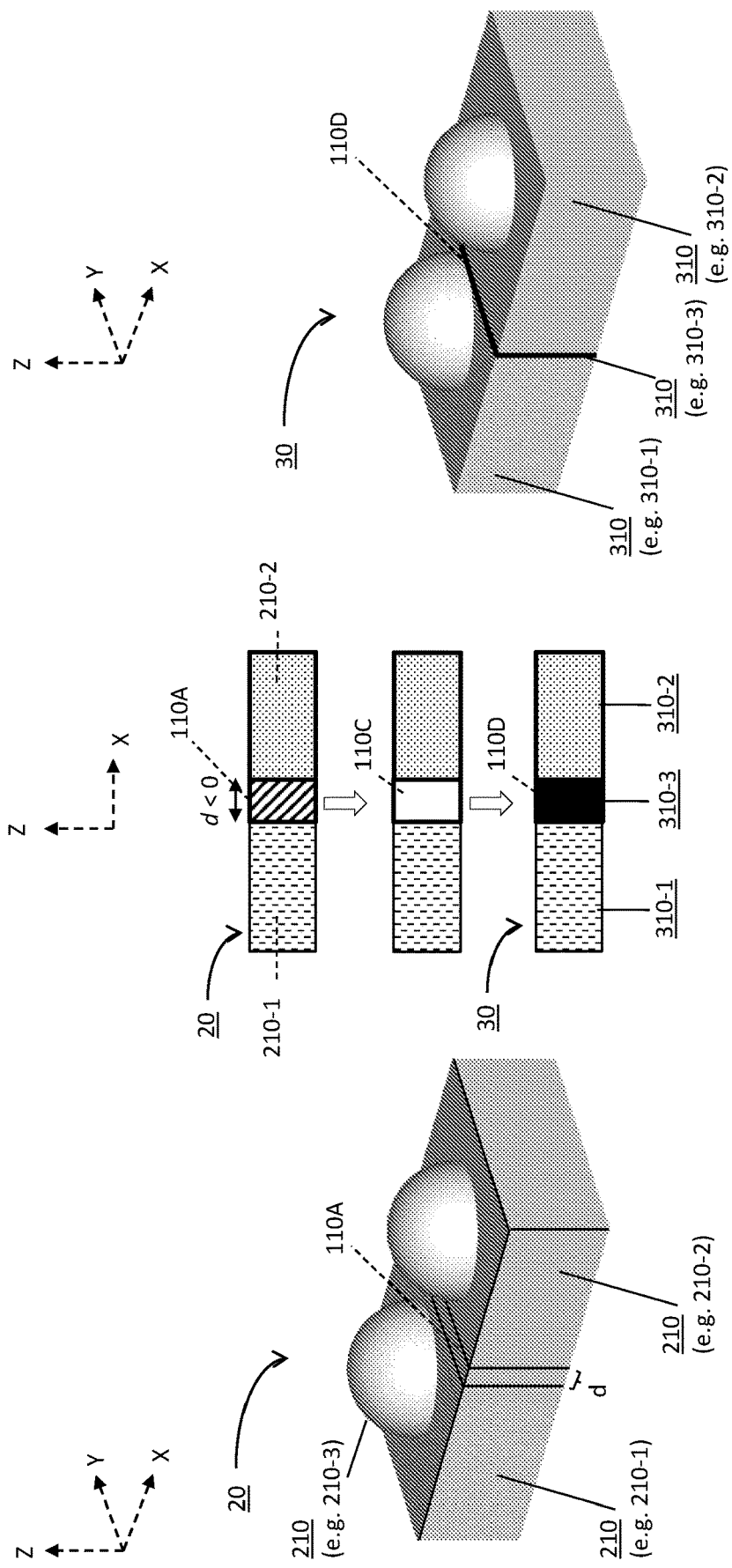

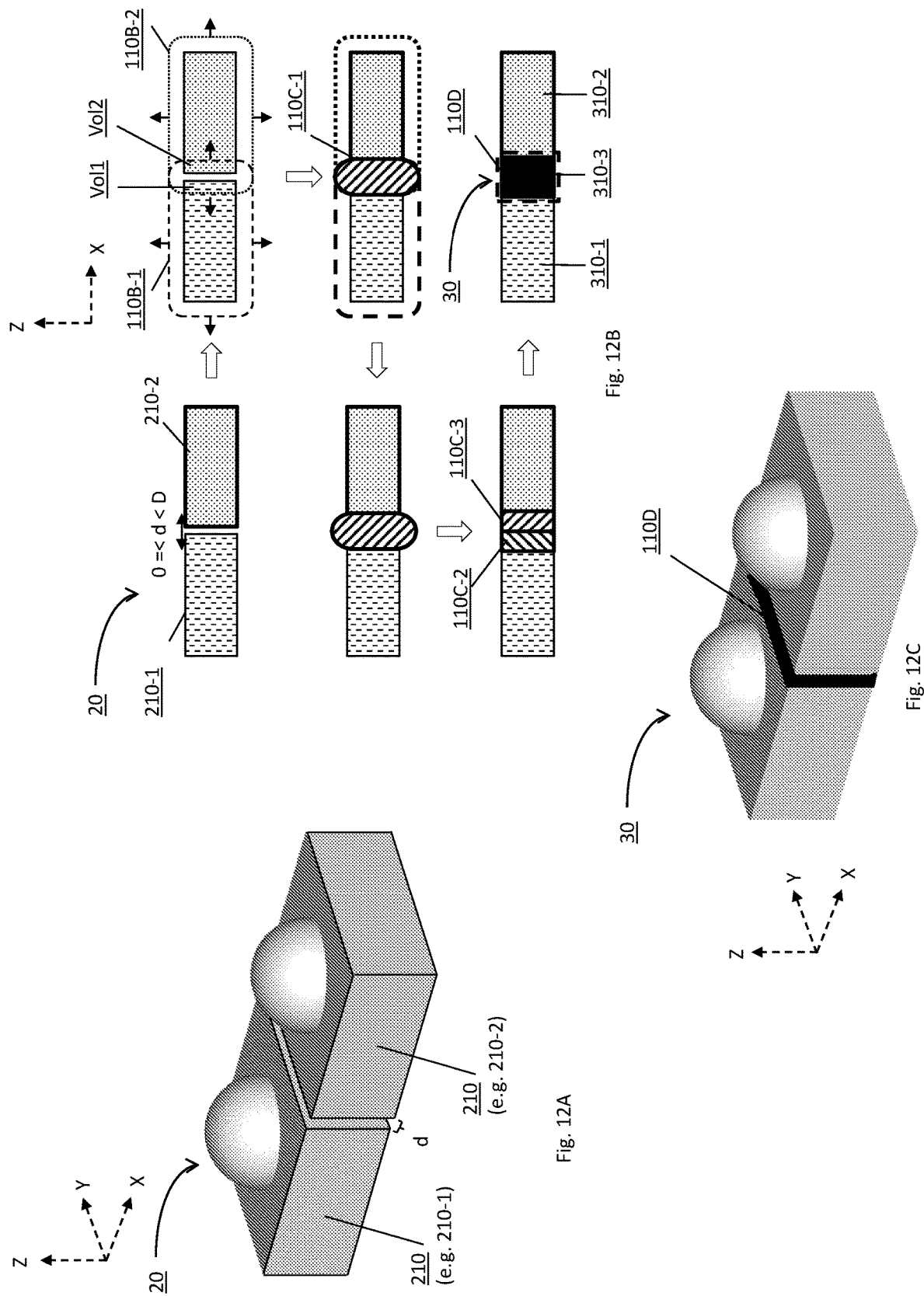

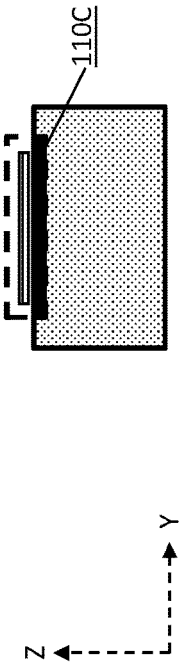
Fig. 14D
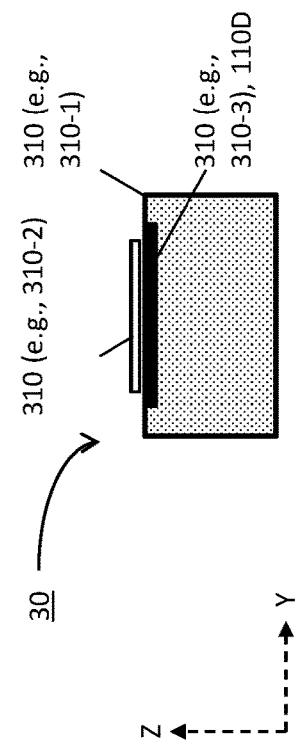
Fig. 14E
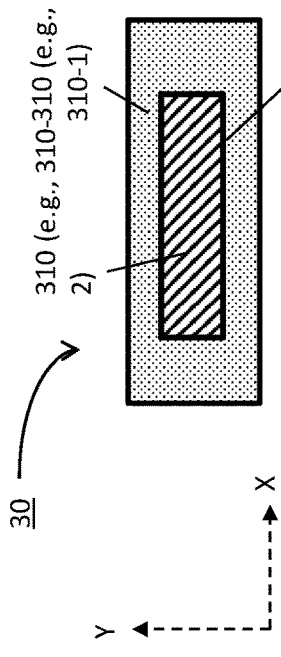
Fig. 14F
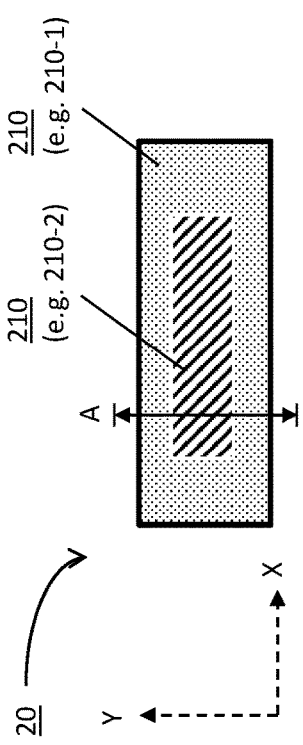
Fig. 14A
Fig. 14B
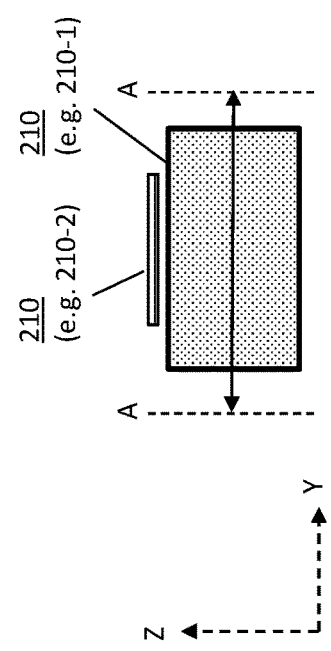
Fig. 14C
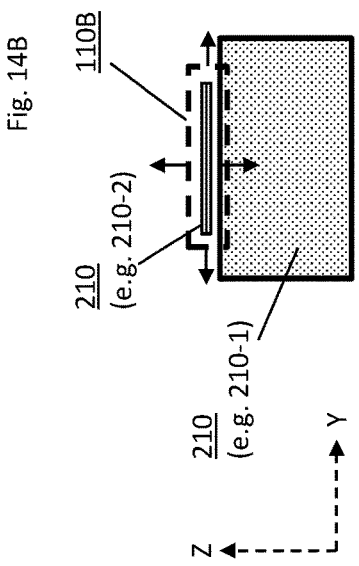

SYSTEM AND METHOD FOR PRINTING A THREE-DIMENSIONAL OBJECT USING A MODIFIED MESH FILE

CROSS-REFERENCE TO RELATED APPLICATIONS

This application is a National Phase Application of PCT International Application No. PCT/IL2021/050616, International Filing Date May 25, 2021, claiming the benefit of U.S. Provisional Patent Application No. 63/029,906, filed May 26, 2020, which are hereby incorporated by reference.

FIELD OF THE INVENTION

The present invention relates generally to printing of three-dimensional objects. More particularly, the invention provides methods and systems for emphasizing a design element on a 3D model and for manufacturing a 3D object comprising an emphasized design element.

BACKGROUND OF THE INVENTION

As known in the art of three-dimensional (3D) printing, 3D printing systems are configured to receive a digital file that includes a representation of a 3D model, and are adapted to manufacture a 3D object corresponding to the 3D model represented in the digital file. The 3D model may, for example, include one or more shells that represents a closed geometry of one or more regions or portions of the 3D object.

In some cases, the 3D model may also include data pertaining to a printing property, such as a color of one or more of the regions associated with the 3D object, and the 3D printer may be adapted to produce or print the 3D object, according to the printing properties (e.g., with specific colors at the designated regions).

In some other cases, a 3D model may include structural or geometrical information, but may lack information pertaining to other properties, such as color or material characteristics. In such conditions, a 3D printer may, for example, produce a 3D printed object having a single printing property, for instance, a single colored material.

For example, in the field of industrial design or rapid prototyping, designers often employ 3D printers in the early stage of the design process, to produce a series of single-color concept models to test different designs for the objects to be created. In order to improve the visualization and emphasize the design lines pertaining to the geometry of the model, designers are often required to manually highlight design lines of the models (e.g., with a marker, pen or pencil), such as contours, seams and edges. This may be cumbersome and time consuming, especially with models having fine details or if a large series of concept models are produced.

SUMMARY OF THE INVENTION

It may be desirable to automatically produce 3D objects, that explicitly convey information regarding the design intent, especially for unicolor concept models, without having to manually highlight design lines on the 3D printed object.

Embodiments of the invention may include a method of printing a 3D object. Embodiments of the method may include: receiving an original mesh file of a 3D object, said mesh file may include a primary mesh data element, representing a respective primary mesh, defined by a plurality of polygons; identifying at least one target design element, associated with the primary mesh; producing at least one auxiliary mesh, based on a geometry of said at least one identified target design element; creating a modified mesh file may include the primary mesh and the at least one auxiliary mesh; and printing the 3D object based on the modified mesh file.

According to some embodiments of the invention, the original mesh file may include at least a first primary mesh data element and a second mesh data element, each of said primary mesh data elements representing a distinct primary mesh.

Embodiments of the invention may include assigning a first printing priority to the primary mesh and a second printing priority to at least one auxiliary mesh, and printing the 3D object according to said printing priorities. As elaborated herein, printing of at least one auxiliary mesh may be prioritized over printing of the primary mesh. Alternatively, printing of the primary mesh may be prioritized over printing of the auxiliary mesh.

As elaborated herein, embodiments of the invention may assign a printing property to the at least one auxiliary mesh. The 3D object may subsequently be printed according to said printing property. The printing property of the auxiliary mesh may be assigned to at least one of a surface and a volume of said auxiliary mesh. Additionally, the printing property of the auxiliary mesh may include, for example, a color, a texture, a printing material, a mechanical property, a void property, and any combination thereof.

According to some embodiments of the invention, the original mesh file may be or may include, for example, a STL file, a VRML file, an OBJ file, a 3MF file, an FBX file, a STP file, and any third-party, proprietary mesh file format. Additionally, or alternatively, embodiments of the invention may receive a native Computer Aided Design (CAD) file such as a CATPART file, CATPRODUCT, an IAM file, an IPT file, an ASM file, a PRT file, a PAR file, an IGES file, an IGS file, an STP file, an STEP file, a JT file, an X_T file, an X_B file, and any third-party, proprietary CAD file format. Embodiments of the invention may subsequently convert the received native CAD file, to produce the original mesh file.

According to some embodiments of the invention, at least one primary mesh forms a closed shell. Additionally, or alternatively, at least one primary mesh forms a surface.

According to some embodiments of the invention, the polygons may be, for example, triangles, quadrilaterals, any other type of polygons, and any combination thereof.

According to some embodiments of the invention, the target design element may be a target line, such as an edge line, a parting line, a contour line, an intersecting line and a tangent line.

Embodiments of the invention may produce an auxiliary mesh, based on a geometry of the target line by: creating a first auxiliary mesh, enveloping at least a portion of the target line; and creating a second auxiliary mesh, corresponding to an overlapping volume between the first auxiliary mesh and the primary mesh. Embodiments may subsequently delete the first auxiliary mesh.

Embodiments of the invention may create a modified mesh file by assigning at least one printing property to the second auxiliary mesh; assigning a first printing priority to the primary mesh; assigning a second printing priority to the auxiliary mesh, so that printing of the second auxiliary mesh may be prioritized over printing of the primary mesh; and including said second auxiliary mesh and said primary mesh in the modified mesh file.

According to some embodiments of the invention, a cross-section of the first auxiliary mesh may be selected from a circle, an ellipse and a rectangle.

Embodiments of the invention may receive, from a user (e.g., via a user interface) an identification of a target design element associated with one or more primary meshes.

Additionally, or alternatively, embodiments of the invention may identify the target design element by identifying a polygon of the first primary shell and a polygon of the second primary shell having a common polygon edge line. For example, embodiments of the invention may identify a target design element associated with a primary mesh by: selecting a first polygon of the primary mesh; selecting a second polygon of the primary mesh, said second polygon having a common polygon edge line with said first polygon; determining a first normal vector of said first polygon; determining a second normal vector of said second polygon; calculating an angle between the first normal vector and the second normal vector; and if said angle exceeds a predefined threshold, identifying said common polygon edge line as belonging to the target design element.

Additionally, or alternatively, embodiments of the invention may identify the target design element associated with the primary mesh by combining two or more common polygon edge lines to form a design element having a shape of a continuous line.

Additionally, or alternatively, embodiments of the invention may identify the target design element associated with the primary mesh by: selecting a first polygon of a first primary mesh; selecting a second polygon of a second primary mesh; and if a face of the first polygon intersects with a face of the second polygon at a polygon intersection line, identifying the polygon intersection line as belonging to the design element.

Additionally, or alternatively, embodiments of the invention may identify the target design element by: selecting a first polygon of a first primary mesh; selecting a second polygon of a second primary mesh, wherein the face of the second polygon intersects with the face of the first polygon at a polygon intersection line; determining a first normal vector of the first polygon; determining a second normal vector of the second polygon; calculating an angle between the first normal vector and the second normal vector; and if said angle exceeds a predefined threshold, then identifying the polygon intersection line as belonging to the design element.

Additionally, or alternatively, embodiments of the invention may identify the target design element by combining two or more polygon intersection lines to form a design element having a shape of a continuous line.

Additionally, or alternatively, embodiments of the invention may identify the target design element by: selecting a first primary mesh; selecting a second primary mesh; and if the first primary mesh intersects with the second primary mesh, then identifying a volume defined by the intersection of the first primary mesh and the one or more second primary meshes as belonging to the target design element. Embodiments of the invention may subsequently produce an auxiliary mesh based on a geometry of said identified target design element, by producing the auxiliary mesh as the intersection of the first primary mesh and the one or more second primary meshes.

Additionally, or alternatively, embodiments of the invention may identify the target design element by: selecting a first primary mesh; selecting a second primary mesh, located at a distance that may be smaller than a predefined threshold from the first primary mesh; producing a first offset mesh enveloping the first primary mesh; producing a second offset mesh enveloping the second primary mesh; identifying a first volume, defined by the intersection of the first primary mesh and the second offset mesh; identifying a second volume, defined by the intersection of the second primary mesh and the first offset mesh; and identifying a unified volume, may include the first volume and the second volume as belonging to the target design element. Embodiments of the invention may subsequently produce a union mesh, enveloping the unified volume. In such embodiments, producing an auxiliary mesh based on a geometry of said identified target design element may include producing an auxiliary mesh corresponding to (e.g., equal to) the union mesh.

Embodiments of the invention may include a system for printing a 3D object. Embodiments of the system may include: a non-transitory memory device, wherein modules of instruction code may be stored, and a processor associated with the memory device, and configured to execute the modules of instruction code.

Upon execution of said modules of instruction code, the processor may be configured to: receive an original mesh file of a 3D object, said mesh file may include a primary mesh data element, representing a respective primary mesh, defined by a plurality of polygons; identify at least one target design element, associated with the primary mesh; produce at least one auxiliary mesh, based on a geometry of said at least one identified target design element; create a modified mesh file may include the primary mesh and the at least one auxiliary mesh; and print the 3D object based on the modified mesh file.

According to some embodiments, the invention provides a method of printing a 3D object. Embodiments of the method may include: receiving an original mesh file of a 3D object, said mesh file comprising a mesh data element representing a mesh; identifying a target design element associated with said mesh; emphasizing said identified target design element; creating a modified mesh file of the 3D object comprising said mesh and said emphasized target design element; and printing said 3D object based on said modified mesh file.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A through 7E are schematic drawings, showing another example of a method of identifying a TDE, such as an intersection line, to be modified in a mesh file, according to some embodiments of the invention;

FIG. 8 is a schematic drawing, showing another example of a method for identifying a TDE such as a tangent line in a mesh file, according to some embodiments of the invention;

FIGS. 9A through 9E are schematic drawings, showing an example of a method of modifying a TDE, such as a target line in a mesh file, according to some embodiments of the invention;

FIGS. 10A through 10D are schematic drawings, showing another example of a method of modifying a TDE, such as a target line in a mesh file, according to some embodiments of the invention;

FIGS. 11A through 11C are schematic drawings, showing another example of a method of modifying a TDE, such as an overlapping volume, in a mesh file, according to some embodiments of the invention;

FIGS. 12A through 12C are schematic drawings, showing another example of a method of modifying a TDE, such as proximate regions of a 3D object, to be modified in a mesh file, according to some embodiments of the invention;

FIGS. 14A through 14F are schematic drawings, showing another example of a method of modifying a TDE, such as a region of a two-dimensional (2D) surface in a mesh file, according to some embodiments of the invention;

Figure 1:
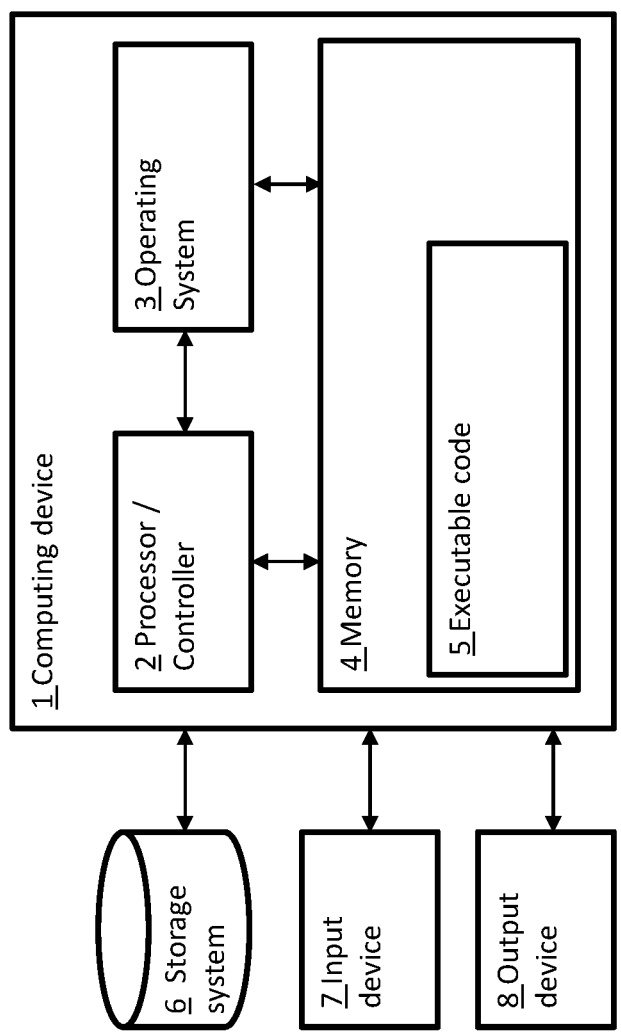
FIG. 1 is a block diagram, depicting a computing device which may be included in a system for printing a 3D object, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for printing of three-dimensional objects, according to some embodiments. The term "object" may refer herein to a complete 3D object or a portion of a 3D object that may be printed by embodiments of the system of the invention.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may be adapted to print 3D objects as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods as described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to, or representing a 3D object to be printed may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The following table, Table 1, is brought as a reference to terms that are used herein.

TABLE 1

| | |
|---|---|
| Mesh, mesh data element, mesh file | The terms "mesh" and "mesh data element" may be used herein interchangeably, to describe a mathematical representation of a 3D model, that may be utilized by a 3D printer to produce a 3D object. A mesh may typically include a plurality of small polygons, which may represent an approximation of a surface of the 3D object. It may be appreciated that as the term "mesh" may refer to a spatial location of the 3D model, a "mesh data element" may refer to a data structure that may be stored on a computer memory, and may represent the spatial location of the 3D model. The term "mesh file" may be used herein to describe a data structure that may include one or more mesh data elements. |
| Shell | The term "shell" may be used herein to describe a mathematical representation of a 3D closed mesh, describing at least one 3D portion of a 3D object. |
| Polygon, polygon data element | The term "polygon" and "polygon data element" may be used herein interchangeably to describe a mathematical representation of a minimal 2D element (e.g., a triangle) that may include a mesh. It may be appreciated that as the term "polygon" may refer to a spatial location of the 2D element, a "polygon data element" may refer to a data structure that may be stored on a computer memory, and may represent the spatial location of the 2D element. For example, in a condition that the polygon is a triangle, the respective polygon data element may be a data structure that may include coordinates of the vertices of the triangle. |

TABLE 1-continued

| | |
|---|---|
| Vertex, Edges, Faces, Surfaces | The terms "vertex", "edge", "face" and "surface" may be used herein to refer to their respective geometric applications, as elaborated herein (e.g., in relation to FIG. 3) |
| Target design element | The term "Target design element" (or TDE) may be used herein to indicate any element that may be included in a model of a 3D object (e.g., in a mesh file), and may be targeted by embodiments of the invention for enhancing, or emphasizing on an subsequent 3D printed object. For example, a design element may be, or may include a line (e.g., a "target line") that is included in the 3D model, a surface that is included in the 3D model, and/or a volumetric region included in the 3D model. |
| Target line | The term "target line" may be used herein to refer to a TDE that includes a 3D representation of one or more lines, that may be included in the 3D model. The one or more lines may be, or may include for example, edge lines, intersection lines, parting lines and tangent lines, as elaborated herein. |
| Auxiliary mesh, intersection mesh | The term "auxiliary mesh" may be used herein to refer to a mesh that may define a 3D shape or volume, that may include at least a portion of a TDE, such as a target line, according to some embodiments of the invention. The term "intersection mesh" may be used herein to refer to a type of an auxiliary mesh, that may be obtained by an intersection of two or more meshes. |
| Polygon intersection line, Intersection line | The term "polygon intersection line" may be used herein to refer to a segment of a target line that includes an intersection of a face of a first polygon with a face of a second polygon. The term "intersection line" may be used herein to refer to a target line, that may include a consecutive plurality of polygon intersection lines. |
| Polygon edge line, Edge line. | The term "polygon edge line" may be used herein to refer to a segment of a target line that includes an edge of a polygon. The term "edge line" may be used herein to refer to a target line, that may include a consecutive plurality of polygon edge lines. |
| Parting line. | The term "parting line" may be used herein to refer to a target line, that may be defined by a border or partition between two meshes of the 3D model. |
| Tangent line. | The term "tangent line" may be used herein to refer to a target line, that may indicate a sharp curvature within a mesh of the 3D model. |
| Contour line | The term "contour line" may be used herein to refer to a target line, that may include a contour of a mesh of the 3D model. |
| Emphasis | The term "emphasis" may refer herein, in relation to a TDE included in a 3D model, to a process of producing, by embodiments of the invention, a modified representation of the TDE, so that it may be discernable on an eventually printed, respective 3D object. |

Figure 2:
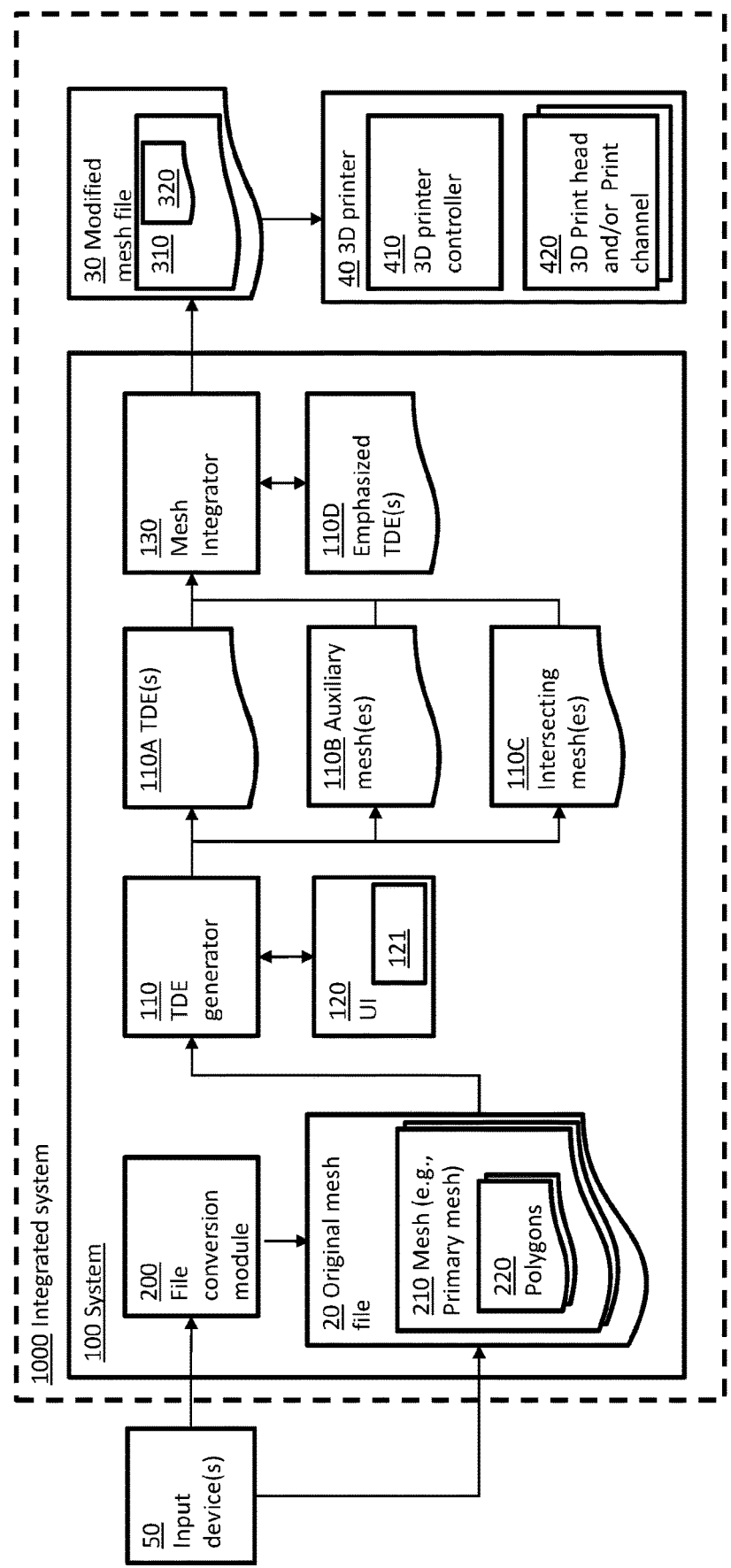
FIG. 2 is a block diagram, depicting a system for printing 3D objects according to some embodiments of the invention.

Reference is now made to FIG. 2, which is a block diagram, depicting a system 100 for printing 3D objects according to some embodiments of the invention.

According to some embodiments of the invention, system 100 may be implemented as a software module, a hardware module or any combination thereof. For example, system may be or may include a computing device (e.g., element 1 of FIG. 1), and may be adapted to execute, by at least one processor or controller (e.g., element 2 of FIG. 1) one or more modules of executable code (e.g., element 5 of FIG. 1) to print a 3D object, as further described herein.

According to some embodiments, system 100 may receive an original mesh file (OMF) 20, pertaining to, defining or representing a 3D printing model or object. According to some embodiments, OMF 20 may include one or more primary mesh data elements 210, representing a spatial location of one or more respective primary meshes, and each of the primary mesh data elements may include, or may be defined by a plurality of polygons 220.

For example, the original mesh file 20 may be, or may include a STL file, a VRML file, an OBJ file, a 3MF file, a FBX file, a STP file, or any other file format known in the art of 3D printing, such as a third-party, proprietary mesh file. As elaborated herein, system 100 may be adapted to create, from original mesh file 20, a modified mesh file (MMF) 30.

According to some embodiments, system 100 may receive at least one OMF 20 from an input device associated with system 100, such as element 7 of FIG. 1. Additionally, or alternatively, system 100 may be communicatively connected (e.g., via the internet) to at least one external computing device, such as input device 50, and may receive the at least one OMF 20 therefrom.

According to some embodiments, OMF 20 may result or may originate from a conversion of a native CAD file into a mesh file, as known in the art. For example, system 100 may include a file conversion module 200, adapted to receive an original CAD file that may include, or may be: a CATPART file, a CATPRODUCT file, an IAM file, an IPT file, an ASM file, a PRT file, a PAR file, an IGES file, an IGS file, an STP file, an STEP file, a JT file, an X_T file, an X_B file, and/or any other native CAD file format such as a third-party proprietary CAD file. File conversion module 200 may subsequently convert the received native CAD file into a mesh data file, so as to create OMF 20.

Figure 3:
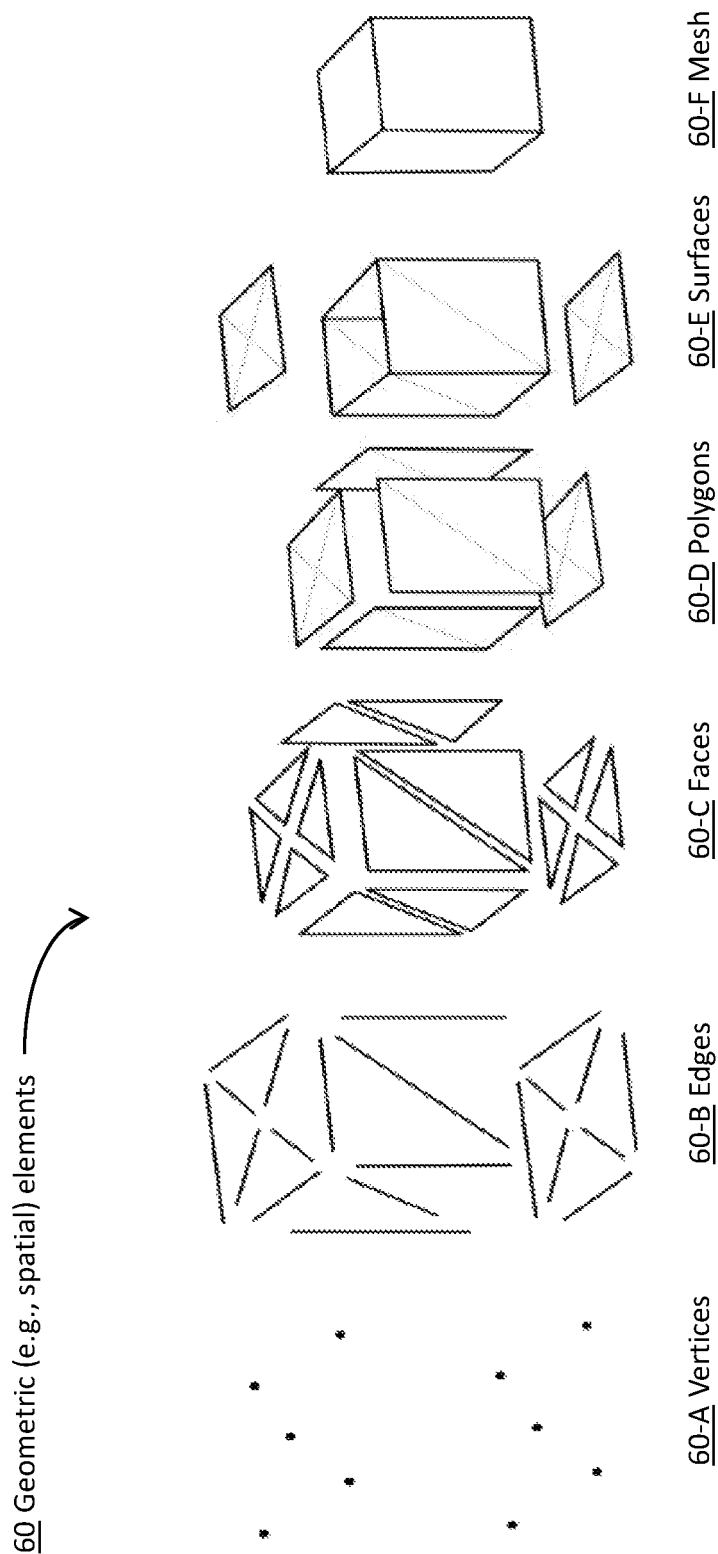
FIG. 3 is a schematic drawing, showing types of geometric elements, according to some embodiments of the invention.

Reference is now made to FIG. 3 which is a schematic drawing, showing some types of geometric elements 60

(e.g., 60-A through 60-F), that may be included in or represented by a mesh file, according to some embodiments of the invention. As known in the art, a mesh file (e.g., elements 20, 30 of FIG. 2) may include one or more data elements that may represent one or more 3D meshes 60-F. The one or more 3D meshes 60-F may represent a physical location of one or more shells or boundaries of a 3D object, to be printed by a 3D printer (e.g., element 40 of FIG. 2).

According to some embodiments, a mesh file (e.g., OMF 20, MMF 30 of FIG. 2) may include one or more mesh data elements 60-F that may represent one or more 3D meshes, such as primary mesh element 210 of FIG. 2 and/or mesh element 310 of FIG. 2. The one or more 3D mesh data elements 60-F may be defined by an aggregation or combination of a plurality of data elements (e.g., elements 60-A through 60-E) that may represent or correspond to respective spatial or geometric elements. The plurality of geometric elements may include, for example, vertices 60-A, edges 60-B, faces 60-C and polygons 60-D (e.g., such as elements 220, 320 of FIG. 2), and surfaces 60-E, as depicted in FIG. 3.

For example, according to some embodiments, at least one 3D mesh data element (e.g., a primary mesh data element 210) may include, or may represent a form of a closed shell (e.g., a spatial position of a closed shell), as depicted in FIG. 3.

In another example, at least one 3D mesh data element (e.g., a primary mesh data element 210) may include, or may represent a form of a surface (e.g., a spatial position of a 2D or 3D surface), as depicted in FIG. 3.

According to some embodiments, the plurality of polygon data elements (e.g., elements 220, 320 of FIG. 2) may be, or may include, for example, spatial representations of triangles, quadrilaterals, and/or any other type of polygons in a 3D space. Additionally, the plurality of polygon data elements (e.g., 220, 320) may include any combination of polygons (e.g., triangles, quadrilaterals, etc.) in the 3D space.

Referring back to FIG. 2, and according to some embodiments, system 100 may be communicatively connected (e.g., via a computer network such as the internet) to a 3D printer 40, and may be configured to forward or transmit (e.g., via the computer network) MMF 30 to the 3D printer 40. 3D printer 40 may, in turn be adapted to print the 3D object, as known in the art, based on the modified mesh file 30.

Alternatively, as shown in FIG. 2, embodiments of the invention may include an integrated system 1000. System 1000 may be referred to as "integrated" in a sense that it may include an integration or aggregation of system 100 and one or more 3D printers 40. For example, integrated system 1000 may be adapted to execute, by at least one processor or controller (e.g., element 2 of FIG. 1) one or more modules of executable code (e.g., element 5 of FIG. 1) to produce one or more MMFs 30 and also control or manage the one or more 3D printers 40, so as to print or produce one or more 3D objects, respectively represented by the one or more MMFs 30, as elaborated herein.

Figure 4:
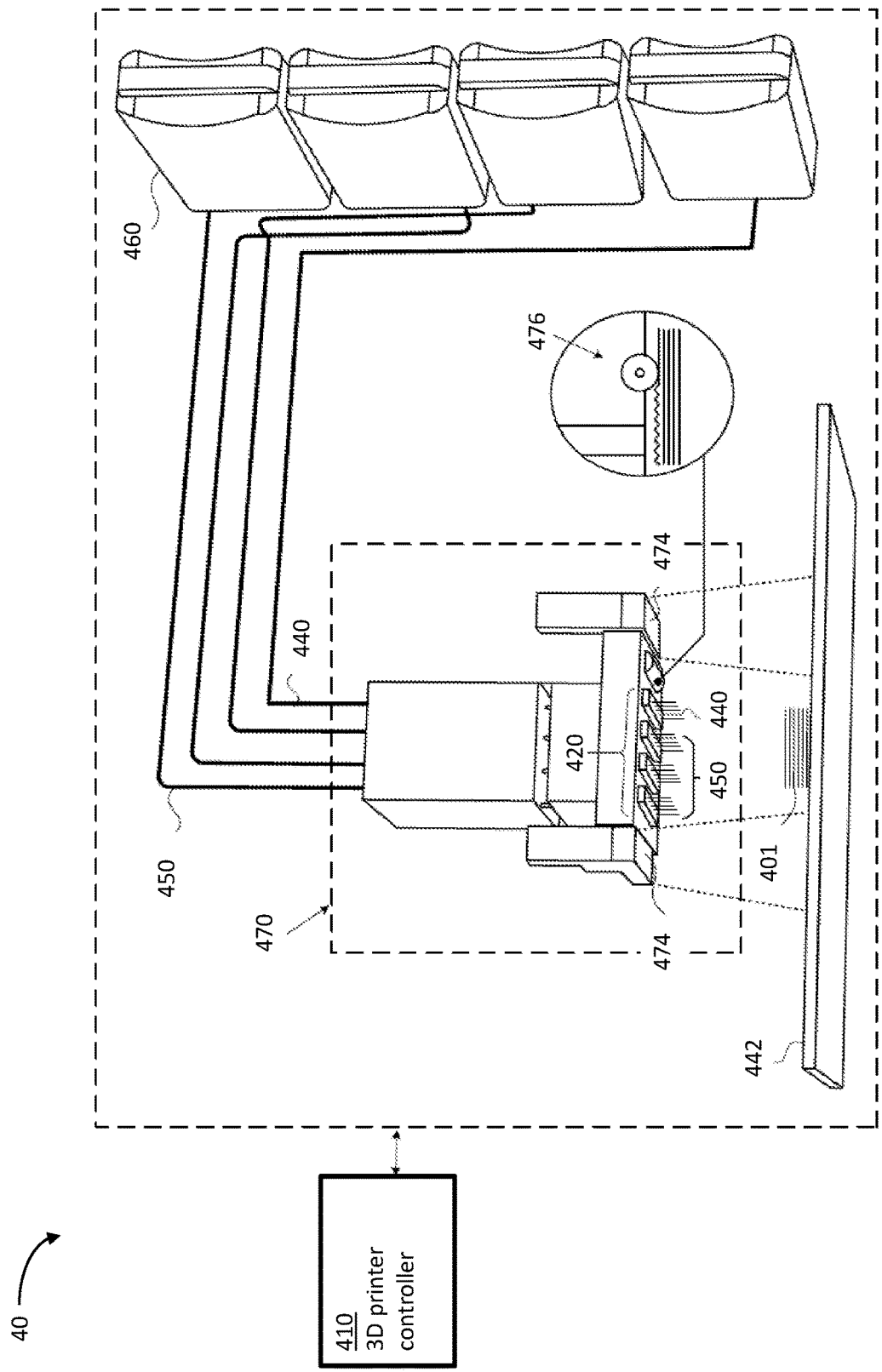
FIG. 4 is a schematic illustration of an example of a 3D printer or printing machine, that may be included in a system for printing 3D objects, according to some embodiments of the invention.

Reference is now made to FIG. 4, which is a schematic illustration of an example of a 3D printer or printing machine 40, that may be included in an embodiment of a system (e.g., integrated system 1000) or communicatively connected to an embodiment of a system (e.g., integrated system 100) for printing 3D objects according to some embodiments of the invention.

According to some embodiments, 3D-printing machine 40 may include a plurality of printing heads and/or printing channels 420 configured to deposit one or more modeling materials 450 (e.g., supplied from cartridges 460), layer by layer, or slice by slice 401.

According to some embodiments, 3D-printing machine 40 may be controllable by a controller 410. Controller 410 may be associated with, and/or part of, 3D-printing system or machine 40. 3D-printing machine 40 may comprise one or more additional functional elements, such as curing elements 474 (e.g., a mercury lamp, a light emitting diode (LED), an IR source, a heat source, and the like), and/or a leveling apparatus 476, that may be located at distinct positions of machine 40, or incorporated into a printing assembly or block 470. 3D-printing machine 40 may further include cartridges 460 and/or printing heads 420 for additional materials, such as a printing support material 440.

According to embodiments of the present invention, a 3D object may be formed by depositing one or more printing materials (e.g., 440, 450), layer by layer 401, in a pattern that corresponds to the shape of the object as defined in a mesh file (e.g., MMF 30).

According to some embodiments, one or more (e.g., each) layer or slice 401 of the 3D object may be formed by a 3D printing machine or printer 40, more specifically a 3D inkjet printing machine 40 having a plurality of inkjet printing heads and/or print head channels 420, via which droplets of printing material (e.g., 440, 450) may be deposited on a building tray 442 or building surface (e.g., a previous layer or slice 401 of an object being printed), according to a computer image of the object. The decision of whether, or whether not to deposit a droplet in a given location may be performed according to a computer image of the layer or slice 401 of the object.

According to some embodiments, building tray 442 may be rectangular, squared or circular, and may have a motion following one or more of its axis X, Y, Z (e.g., for raster printing), or R and Theta (e.g., for angular printing).

According to some embodiments, each printing material (e.g., 440, 450) may be deposited from a separate print head and/or print head channel 420 via one or more longitudinal arrays of nozzles. In some embodiments a print head 420 may have more than one array of nozzles, and more than one printing material may be dispensed by a print head 420. Typically, print head 420 is a piezoelectric or thermal print head, but other technologies may be used.

The term "printing material" as used herein may, for example, refer to one of a modeling material 450 and a support material 440. As known in the art, modeling materials 450 may include materials that may be intended to form at least part of the 3D object and optionally part of one or more support constructions for the 3D object, e.g., to provide a support construction with further strength. A typical modeling material 450 may be able to form a 3D object on its own, without being combined with another material, or may be combined with another material to provide a 3D object or part of a 3D object having pre-defined properties. A support material 440 may be a material that may be intended to form at least part of a support construction for supporting the object, object parts or subsequent layers 101 of the object in the course of printing (e.g., to support overhangs or hollow portions in the 3D object). In some cases, support material 440 may also be dispensed to form a part of the 3D object.

Modeling material 450, support material 440 and/or combinations of modeling materials 450 and/or combinations of modeling material 450 and support material 440 may be hardened or solidified, (e.g., cured, as commonly referred to in the art) following deposition, to provide a layer 401 or slice of the 3D object being printed. According to some embodiments of the invention, the printing materials (e.g., 440, 450) may be photocurable materials, such as photopolymers. In such embodiments, curing may be performed by exposure to UV light after deposition using one or more curing elements 474.

Figure 5A:
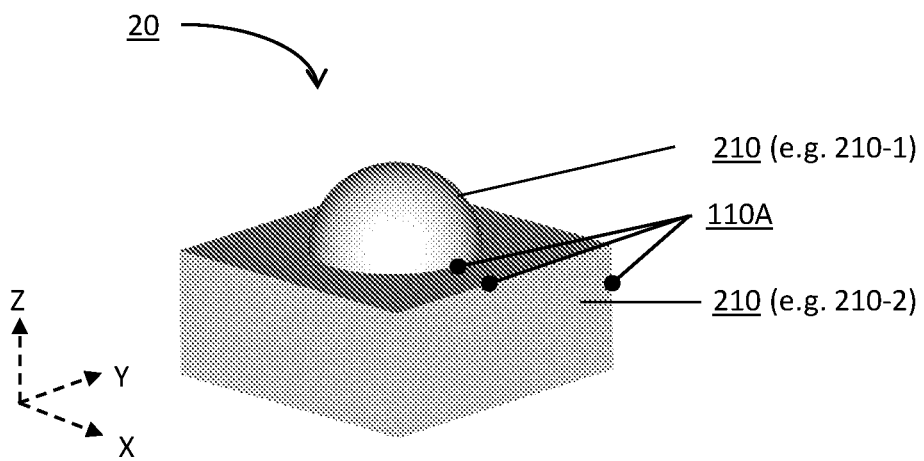
FIG. 5A and FIG. 5B are schematic illustrations of an example of a 3D object, that may be included in, or represented by an original mesh file (OMF) and a modified mesh file (MMF) respectively, according to some embodiments of the invention.
Figure 5B:
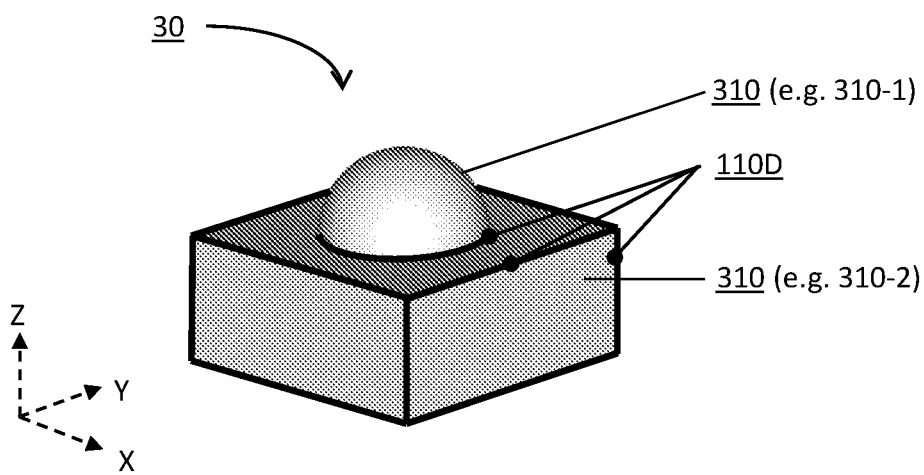

Reference is now made to FIGS. 5A and 5B, which are schematic illustrations of an example of a 3D object, that may be included in, or represented by, an OMF 20 and an MMF 30 respectively, according to some embodiments of the invention.

As shown in FIG. 5A, the 3D object may be defined in OMF 20 by one or more primary mesh data elements 210 (e.g., 210-1 and 210-2). Additionally, or alternatively, the 3D object may be defined in MMF 30 by one or more primary mesh data elements 310 (e.g., 310-1 and 310-2).

In the example of FIG. 5A, the 3D object is defined in OMF 20 by a first primary mesh 210 (e.g., element 210-1, the depicted sphere) and a second primary mesh 210 (e.g., element 210-2, the depicted cube). The term "primary" may refer herein to a mesh that may be included in an OMF 20, and may be subject to modification(s) according to embodiments of the invention, as elaborated herein.

Additionally, or alternatively, as shown in the example of FIG. 5B, the 3D object may be defined in MMF 30 by a first mesh 310 (e.g., element 310-1, the depicted sphere) and a second mesh 310 (e.g., element 310-2, the depicted cube).

According to some embodiments of the invention, system 100 may be configured to identify one or more TDEs 110A, such as target lines 110A, on one or more primary meshes 210 of OMF 20, as elaborated herein. System 100 may be configured to emphasize the one or more identified target lines 110A so as to produce emphasized target lines 110D (e.g., depicted as thick lines in FIG. 5B). System 100 may subsequently generate MMF 30, and include emphasized target lines 110D in MMF 30 as elaborated herein.

The term "target line" may refer herein to a spatial position of a TDE that may be included (explicitly or intrinsically) in a model of a 3D object represented by OMF 20, and is formed as a 3D line. As the term 'target' implies, embodiments of the invention may be adapted to target, or identify such lines in the 3D object of OMF 20, so as to emphasize or highlight the target line in a subsequent 3D-printed object.

The term "emphasis" may refer herein, in relation to a TDE 110A included in a 3D model, to a process of producing, by embodiments of the invention, a modified representation of TDE 110A, so that it may be discernable on an eventually printed, respective 3D object.

For example, TDE 110A may be a target line 110A that may be a mathematical, one-dimensional representation (e.g., having no volume, such as an edge of a polygon, as depicted in FIG. 3) of a spatial position in a 3D space. A corresponding emphasized TDE 110D may be a target line 110D that may include a representation of a 3D volumetric entity that may be printable by a 3D printer 40.

In this example, system 100 may be adapted to emphasize TDE 110A (e.g., a target line 110A), by a process elaborated herein, e.g., in relation to FIGS. 9A through 9E. This process may be briefly summarized as follows:

System 100 may produce at least one auxiliary mesh or intersection mesh (e.g., elements 110B, 110C of FIG. 9A), based on a geometry of the at least one identified TDE 110A. For example, the auxiliary 110B mesh and/or intersection mesh 110C may define a volume surrounding at least a portion of the identified TDE 110A;

System 100 may create MMF 30 based on OMF 20 (e.g., including a version 310 of primary meshes 210 of OMF 20);

System 100 may include the at least one produced auxiliary mesh in MMF 30; and System 100 may print the 3D object by a 3D printing machine, using MMF 30 as an input file.

In another example, a TDE 110A may include a volumetric region in a 3D model, that may initially (e.g., as represented by OMF 20) have identical printing properties (e.g., a first printing color) as its surroundings. A corresponding emphasized TDE 110A may be assigned printing properties (e.g., a second printing color) that may allow TDE 110A to be distinguished (e.g., by a human observer) from its surroundings.

It may be appreciated that embodiments of the invention may be configured to identify a variety of types of TDEs that are target lines 110A, including for example, polygon edge lines, edge lines, parting lines, contour lines, tangent lines, polygon intersection lines and/or intersection lines, as elaborated in the examples provided herein.

For example, target line 110A may include one or more TDEs that are edge lines, or polygon edge lines (e.g., as depicted in FIG. 3).

Additionally, or alternatively, target line 110A may include one or more TDEs that are parting lines, defining a partition or gap between one or more polygons of one or more respective 3D meshes (e.g., as elaborated in relation to FIGS. 11A through 11C).

Additionally, or alternatively, target line 110A may include one or more TDEs that are intersecting lines or polygon intersection lines, defining an intersection between one or more polygons of one or more respective 3D meshes (e.g., as elaborated in relation to FIGS. 7A through 7C). Additionally, or alternatively, target line 110A may include one or more TDEs that are tangent lines, defining a tangent to one or more polygons of one or more respective 3D meshes as elaborated herein (e.g., in relation to FIG. 8). Additionally, or alternatively, target line 110A may include one or more contour lines, defining a contour of at least one 3D mesh (e.g., as elaborated in relation to FIGS. 15A through 15F).

As shown by the bold lines in the example of FIG. 5B, a first TDE may be a target line 110A that is an intersection line, marking an intersection of spherical mesh 210-1 and cube mesh 210-2. A second TDE may be a target line 110A that is an edge line, marking an edge of a face of cube mesh 210-2.

Additionally, or alternatively, system 100 may include a user interface (UI) module 120, adapted to receive one or more data elements from a user. In such embodiments, an identification of a TDE 110A (e.g., a target line 110A) on a primary mesh may be performed by the user (e.g., via UI 120 of FIG. 2). Thus, embodiment of the invention may allow a user to mark or provide (e.g., manually or by a third-party software module) one or more TDEs 110A (e.g., target lines 110A) for further analysis, as elaborated herein.

According to some embodiments of the inventions, UI 120 may receive (e.g., from a user) a selection of one or more actions and/or configurations 121 of system 100. Configurations 121 may include, for example, (1) turning on/off an option to identify and/or emphasize TDEs 110A that are edge lines 110A; (2) turn on/off the option to identify and/or emphasize TDEs 110A that are shell edge lines 110A; (3) turn on/off the option to identify and/or emphasize TDEs 110A that are parting lines 110A (between intersecting parts); (4) turn on/off the option to identify and/or emphasize TDEs 110A that are tangent lines 110A; (5) turn on/off the option to identify and/or emphasize specific TDEs 110A; (6) turn on/off the option to identify and/or emphasize all TDEs 110A; (7) define the printing material(s) of the emphasized TDEs 110D; (8) define one or more colors of the emphasized TDEs 110D; (9) define a style of the emphasized TDEs 110D (e.g., uniform, gradient, textured, draft style, etc.); (10) define a width of emphasized TDEs 110D; (11) define a depth (e.g., also referred to as a "notch" or an "emboss" effect) of emphasized TDEs 110D (e.g., as elaborated herein, in relation to FIG. 13); (12) define a geometry (e.g., a straight, a rounded or a curved intersection) of an emphasized TDEs 110D such as an embossed target line; (13) print only the emphasized TDEs 110D (e.g., only emphasized target lines), omitting all the original mesh data elements; (14) emphasize all the lines included in OMF 20 (e.g., so as to emphasize all polygon edges of OMF 20); and (15) any combination thereof.

According to some embodiments, system 100 may create or produce an MMF 30 that may be based on OMF 20, and may include data pertaining to one or more emphasized TDEs 110D, such as emphasized target lines 110D.

For example, as shown in FIG. 5B, the one or more mesh elements 310 of MMF 30 may include data pertaining to the one or more primary meshes 210 of OMF 20, including for example, a physical location of one or more elements (e.g., polygons 220) of OMF 20. Thus, MMF 30 may include data that may describe or represent at least one part of, or a version of the 3D model represented by OMF 20 (e.g., the depicted cube and/or sphere).

Additionally, the one or more mesh elements 310 of MMF 30 may include data pertaining to, or representing a spatial location of the one or more emphasized TDEs (e.g., emphasized target lines) 110D, as elaborated herein. For example, the one or more mesh elements 310 of MMF 30 may include at least one auxiliary mesh data element, that define a volume and/or a shape of at least one respective emphasized TDE (e.g., emphasized target line) 110D.

According to some embodiments, system 100 may subsequently transfer MMF 30 to 3D printer 40, which may in turn print the 3D object based on MMF 30. In other words, 3D printer 40 may utilize MMF 30 so as to print or produce a 3D object that includes at least the one or more emphasized TDEs (e.g., emphasized target lines) 110D.

Figure 6A:
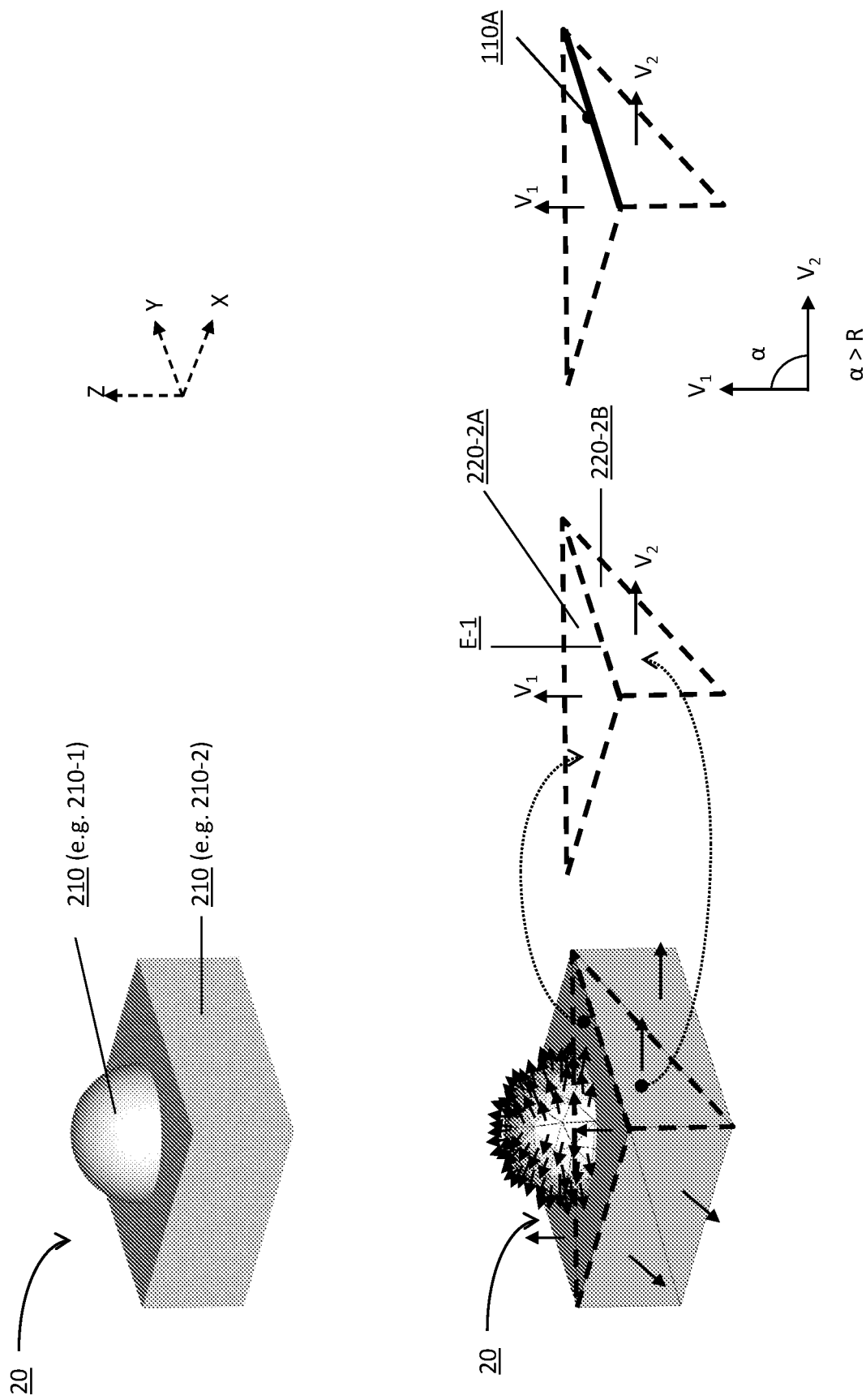
FIG. 6A and FIG. 6B are schematic drawings, showing a method of identifying a target design element (TDE), such as an edge line to be modified in a mesh file, according to some embodiments of the invention.
Figure 6B:
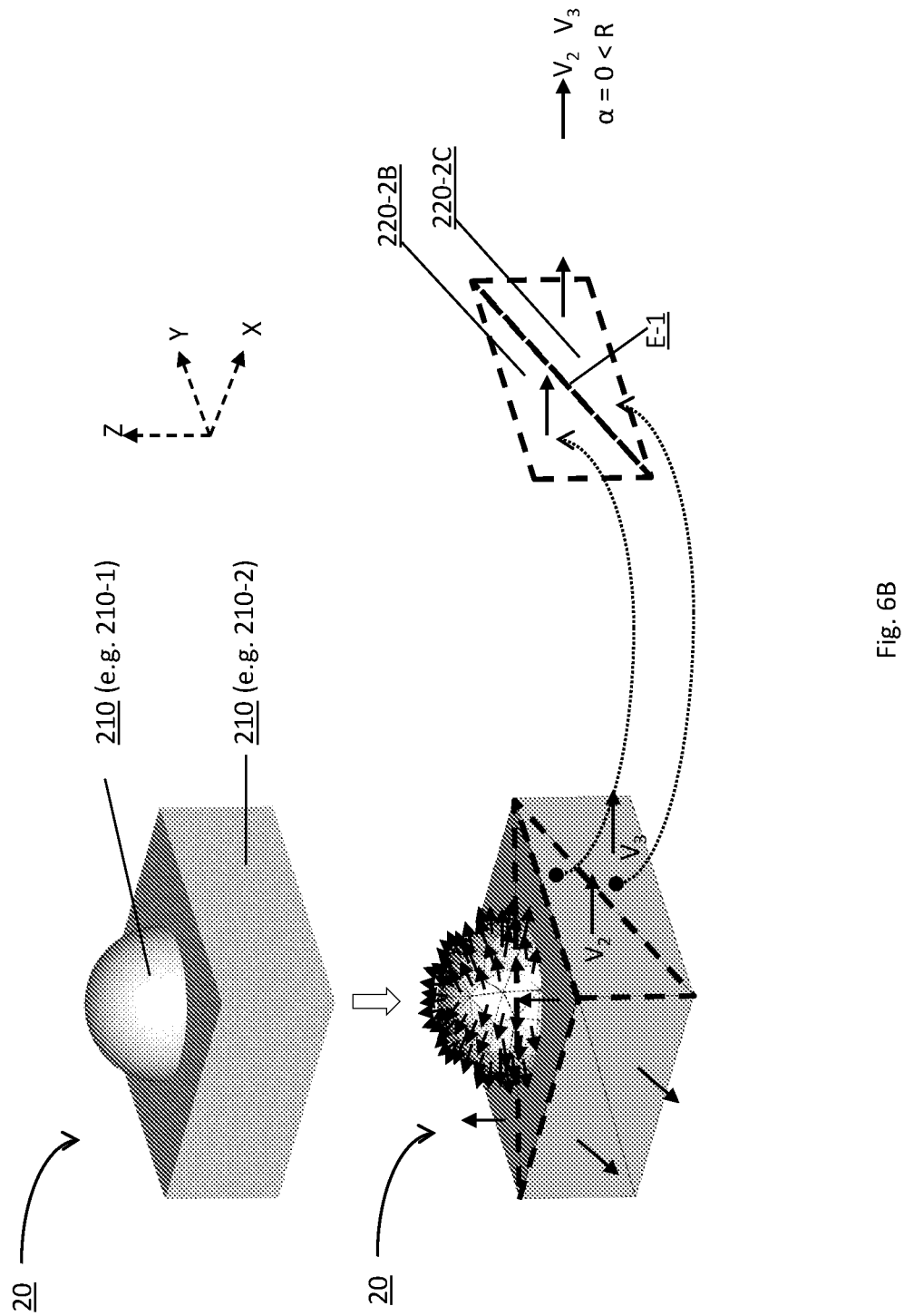

Reference is now made to FIG. 6A and FIG. 6B, which are schematic drawings, showing a method of identifying a TDE 110A, such as an edge line, to be modified in a mesh file, according to some embodiments of the invention.

FIG. 6A depicts an isometric view of a 3D printing model that is defined or described by an original mesh file 20. According to some embodiments, and as shown in FIG. 6A, OMF 20 may include a first primary mesh data element 210 and a second primary mesh data element 210, each representing a distinct primary mesh (e.g., elements 210-1 and 210-1).

As shown in FIG. 6A, OMF 20 may include a first data element representing a first primary mesh 210 (e.g., element 210-1, the depicted sphere) and a second data element, representing a second primary mesh 210 (e.g., element 210-2, the depicted cuboid). As shown in FIG. 6A, the one or more mesh data elements 210 (e.g., 210-1, 210-2) of OMF 20 may each include one or more polygon data elements 220, representing polygons in a 3D space (e.g., polygons 220-2A and 220-2B of mesh 210-2).

According to some embodiments, system 100 may include a TDE generator module 110, adapted to identify a TDE 110A, such as a target line 110A, based on normal vectors of the polygon data elements of OMF 20.

For example, TDE generator module 110 may be configured to select a first polygon (e.g., 220-2A) of a primary mesh (e.g., 210-2) and select a second polygon (e.g., 220-2B) of the primary mesh (e.g., 210-2), where the first polygon 220-2A has a common edge line (such as element 60-B of FIG. 3), marked E1, with the second polygon 220-2B. TDE generator module 110 may calculate or determine a first normal vector (marked "V1") of first polygon 220-2A and calculate or determine a second normal vector (marked "V2") of second polygon 220-2B. TDE generator module 110 may subsequently calculate a spatial angle (marked "α") between first normal vector V1 and second normal vector V2, and may compare the calculated spatial angle α to a predefined threshold (marked "R", e.g., selected from 5 to 175 angular degrees). TDE generator module 110 may then identify the common polygon edge line E1 as belonging to the TDE 110A, based on the comparison.

For example, if the calculated spatial angle α exceeds predefined threshold R, as depicted in FIG. 6A, then TDE generator module 110 may identify the common edge (e.g., element E1) of first polygon 220-2A and second polygon 220-2B as belonging to, or forming a target line 110A. In a complementary manner, as depicted in FIG. 6B, if the calculated spatial angle α between normal vectors (e.g., between normal vectors V2 and V3, corresponding to polygons 220-2B and 220-2C respectively) does not exceed predefined threshold R, then TDE generator module 110 may identify the common edge 60-B of first polygon 220-2B and second polygon 220-2C as not belonging to, or forming a target line 110A.

Additionally, or alternatively, TDE generator module 110 may combine or aggregate two or more common polygon edge lines 60-B to form a TDE 110A (e.g., a target line) having a shape of a continuous line. For example, TDE generator module 110 may combine one or more adjacent polygon edge lines (e.g., element E1) to form a TDE 110A that is a continuous target line, and includes a plurality of segments, each representing a polygon edge line (e.g., such as element E1).

Reference is now made to FIG. 8, which is a schematic drawing, showing an example of a method of identifying a target line in a mesh file, according to some embodiments of the invention.

FIG. 8 depicts an isometric view of a 3D printing model that is defined or described by an original mesh file 20. As shown in FIG. 8, OMF 20 may include a data element representing a primary mesh 210 which includes a curved surface including tangent lines. Primary mesh 210 of OMF 20 may include one or more polygons 220, such as polygon 220-A and 220-B.

According to some embodiments, system 100 may include a TDE generator module 110, adapted to identify a target line 110 or a segment thereof (e.g., S1) based on normal vectors of one or more polygons 220 of OMF 20.

For example, TDE generator module 110 may be configured to select a first polygon (e.g., 220-A) and select a second polygon (e.g., 220-B), where the first polygon 220-A has a common edge with the second polygon 220-B. TDE generator module 110 may calculate or determine a first normal vector (marked "V1") of first polygon 220-A and calculate or determine a second normal vector (marked "V2") of second polygon 220-B.

According to some embodiments, TDE generator module 110 may calculate a spatial angle (marked "α") between first normal vector V1 and second normal vector V2, and may compare the calculated spatial angle α to predefined thresholds (marked "m" and "M", e.g., m=1 and M=89 angular degrees).

For example, if the calculated spatial angle α is comprised between the values of thresholds m and M, as depicted in FIG. 8, then TDE generator module 110 may identify the common edge of first polygon 220-A and second polygon 220-B as belonging to, (e.g., segment S1) or forming a target line 110A.

Alternatively, if the calculated spatial angle α between the normal vectors is not comprised between the values of threshold m and M, then TDE generator module 110 may identify the common edge of the two polygons as not belonging to, or forming a target line 110.

Additionally, or alternatively, TDE generator module 110 may combine or aggregate two or more polygon edge lines in a target line 110. For example, TDE generator module 110 may combine one or more adjacent polygon edge lines (e.g., S1) to form a continuous target line 110 that may include a plurality of segments (e.g., SU each representing a polygon edge line.

Reference is now made to FIGS. 7A through 7E, which are schematic drawings, showing another example of a method of identifying a TDE 110A, such as an intersection line 110A, to be modified in a mesh file, according to some embodiments of the invention.

FIG. 7A depicts an isometric view of a 3D printing model that may be defined or described by OMF 20.

FIG. 7B depicts two specific polygons (elements 220-1A, 220-2A) of OMF 20, intersecting along a polygon intersection line (e.g., element S1). FIG. 7C depicts a close-up of intersection line S1 between polygons 220-1A and 220-2A.

FIG. 7D depicts a target line 110A, consisting a plurality of polygon intersection lines (e.g., such as element S1), and FIG. 7E depicts an isometric view of a 3D printing model that may be defined or described by MMF 30, according to some embodiments.

As elaborated herein (e.g., in relation to FIG. 6A) OMF 20 may include a first data element representing a first primary mesh 210 (e.g., element 210-1, the depicted sphere) and a second data element, representing a second primary mesh 210 (e.g., element 210-2, the depicted cuboid). The one or more meshes 210 (e.g., 210-1, 210-2) of OMF 20 may each include one or more polygons 220, such as polygon 220-1A of mesh 210-1 and polygon 220-2A of mesh 210-2.

According to some embodiments, TDE generator module 110 may be configured to identify a TDE 110A such as a target line 110A that is an intersection line, based on identification of one or more polygon intersection lines.

For example, TDE generator module 110 may be configured to select a first polygon data element, representing a first polygon of a first primary mesh (e.g., polygon 220-1A of mesh 210-1) and select a second polygon data element, representing a second polygon of a second primary mesh (e.g., polygon 220-2A of mesh 210-2). If the first polygon (e.g., polygon 220-1A) intersects, or has a face that intersects with a face of the second polygon (e.g., polygon 220-2A) at a polygon intersection line (marked S1), then TDE generator module 110 may identify the polygon intersection line (e.g., S1) as belonging to the TDE 110A.

According to some embodiments, and as shown in FIG. 7D, TDE generator module 110 may combine or aggregate two or more polygon intersection lines (e.g., lines S1 through S8) in a TDE 110A that is an intersection target line 110A. For example, TDE generator module 110 may combine one or more adjacent polygon intersection lines (e.g., S1, S2 etc.) to form a TDE 110A that has a shape of a continuous target line 110A that includes a plurality of segments, each representing a respective polygon intersection line.

Additionally, or alternatively, TDE generator module 110 may identify one or more polygon intersection lines (e.g., S1, S2 etc.) as forming or belonging to a target line 110A based on normal vectors of respective intersecting polygons. Pertaining to the same example depicted in FIGS. 7A through 7E, TDE generator module 110 may calculate or determine a first normal vector (marked V1) pertaining to the first polygon (e.g., polygon 220-1A of mesh 210-1), and calculate or determine a second normal vector (marked V2) pertaining to the second polygon (e.g., polygon 220-2A of mesh 210-2). TDE generator module 110 may calculate a spatial angle (marked 'a') between the first normal vector V1 and the second normal vector V2. TDE generator module 110 may compare the calculated spatial angle α to a predefined threshold (marked "R", e.g., selected from 5 to 175 angular degrees), and identify TDE 110A (e.g., an intersection target line 110A) based on the comparison. For example, if angle α is equal to, or exceeds predefined threshold R, then TDE generator module 110 may identify polygon intersection line (e.g., S1) between the first polygon (e.g., 220-1A) and the second polygon (e.g., 220-2A) as an intersecting line that belongs to, or forms TDE 110A (e.g., an intersection target line 110A. In a complementary manner, if angle α does not exceed predefined threshold R, then TDE generator module 110 may identify the intersecting line (e.g., S1) between the first polygon (e.g., 220-1A) and the second polygon (e.g., 220-2A) as an intersecting line that does not belong to, or form target line 110A.

According to some embodiments, and as shown in FIG. 7E, system 100 may be configured to create or produce a MMF 30 that may be based on OMF 20, and may include data pertaining to one or more modified target lines 110D.

For example, the one or more mesh elements 310 (e.g., 310-1, 310-2) of MMF 30 may include data pertaining to the one or more primary meshes 210 (e.g., 210-1, 210-2, respectively) of OMF 20, including for example, a physical location of one or more elements (e.g., polygons 220) of OMF 20. Thus, MMF 30 may include data that may describe or represent at least one part of the 3D object represented by OMF 20 (e.g., the depicted cuboid and/or sphere). Additionally, the one or more mesh elements 310 of MMF 30 may include data pertaining to, or representing a spatial location of an emphasized version of target line 110A, e.g., emphasized target line 110D, as elaborated herein.

Reference is now made to FIGS. 9A through 9E, which are schematic drawings, showing an example of a method of modifying a TDE 110A, such as a target line in a mesh file, according to some embodiments of the invention. More specifically, FIG. 9A depicts an isometric view of a target line 110A; FIG. 9B depicts a side view of target line 110A with an enveloping auxiliary shell 110B; FIG. 9C depicts an intersecting shell 110C, which may define an overlapping volume (marked by diagonal lines) between a primary shell 210 of OMF 20 and auxiliary shell 110B, according to some embodiments; FIG. 9D shows an example of an emphasized TDE 110D (e.g., an emphasized target line 110D) in MMF 30, according to some embodiments; and FIG. 9E depicts attribution or assignment of at least one printing property (marked "Property-a", "Property-b") and/or one or more printing priority (marked "Priority-a", "Priority-b") to shells in MMF 30, according to some embodiments.

As elaborated herein (e.g., in relation to FIG. 6A), TDE generator 110 may identify a target line 110A in a primary mesh 210 of an OMF 20. Target line 110A may, for example include, or be comprised of one or more of segments, such as edges between polygons of OMF 20. Target line 110A may be a mathematical representation of a physical location of a line in a 3D space, and may lack a dimension of thickness.

In order to enable printing of line 110A (e.g., a 3D line lacking thickness) by a 3D printer 40, embodiments of the invention may emphasize target line 110A, so as to attribute a dimension of thickness to target line 110A, thus creating an emphasized target line 110D.

Embodiments of the invention may modify OMF 20, so as to include a representation of emphasized target line 110D, thus generating MMF 30.

According to some embodiments, MMF 30 may include at least one primary mesh data element 310 that may represent a geometry of at least one primary mesh 210 of OMF 20. In other words, MMF 30 may include one or more mesh data elements 310 that are respectively equal to one or more primary mesh 210 data elements of OMF 20.

Additionally, or alternatively, MMF 30 may include one or more primary mesh data elements 310 that include a modified version of a geometry of one or more respective primary mesh data elements 210 of OMF 20, modified near TDE 110A (e.g., target line 110A), as elaborated in the examples that follow.

Additionally, or alternatively, MMF 30 may include one or more auxiliary mesh data elements and/or auxiliary intersection mesh data elements (e.g., element 110C) that may represent or define a physical, 3D location or volume of emphasized TDE 110D (e.g., emphasized target line 110D).

Additionally, MMF 30 may include an assignment or attribution of at least one printing property, marked "Property-a", to one or more primary mesh data elements 310 and/or to one or more auxiliary mesh data elements (e.g., intersection auxiliary mesh 110C), marked "Property-b". For example, MMF 30 may include a table that may assign a printing property (e.g., a color) to at least one auxiliary mesh data elements (e.g., 110C, defining a spatial location of target line 110D), so as to highlight the location of emphasized target line 110D on the subsequent 3D printed object.

The at least one printing property (e.g., "Property-a", "Property-b") may include, for example, a selection of a printing material, a printing pattern, a printing effect (e.g., embossed printing, gradient printing, and the like), a texture of a printing material, a color of a printing material (e.g., color vector in a Red Green and Blue (RGB) color space, a color vector in a Cyan, Magenta, Yellow and Black (CMYK) color space, and the like), a color of a printing material (e.g., a selection of a specific print head or print channel 420 of 3D printer 40), a mechanical property of a printing material, a void property (e.g., indicating that a support material should be used instead of printing material), any other properties achievable by 3D printing, and any combinations thereof.

Additionally, MMF 30 may include an assignment or attribution of at least one printing priority, marked "Priority-a", to one or more primary mesh data elements 310 and/or to one or more auxiliary mesh data elements (e.g., intersection auxiliary mesh 110C), marked "Priority-b".

In some embodiments, MMF 30 may include a table that may assign a first printing priority, to at least one first printing priority to a primary mesh (e.g., 310) and a second printing priority to at least one auxiliary mesh (e.g., 110C). In this condition, 3D printing machine maybe configured to printing the 3D object according to said printing priorities.

For example, in a condition that "Priority-b" is higher than "Priority-a", printing of the at least one auxiliary mesh (e.g., intersection auxiliary mesh 110C) may be prioritized over printing of the primary mesh (e.g., 310), thus emphasizing or highlighting TDE 110A on the printed 3D object. In a complementary manner, in a condition that "Priority-a" is higher than "Priority-b", printing of the primary mesh 310 may be prioritized over printing of the auxiliary mesh 110C, and thus TDE 110A may not be highlighted on the printed 3D object.

In the example depicted in FIGS. 9A through 9E, a TDE 110A may have already been identified by TDE generator 110. In this example, TDE 110A may be a target line 110A that is an edge line between polygons 220-2a and 220-2b, such as discussed in relation to FIG. 6A.

According to some embodiments, TDE generator 110 may create a first auxiliary mesh data element 110B that may be centered on target line 110A, defining a 3D physical location of a shell or a boundary, located around, enveloping or surrounding at least a portion of target line 110A, as depicted in FIG. 9A.

As shown in FIG. 9B, a cross-section of auxiliary mesh 110B may be, for example a circle. It may be appreciated that additional cross-section shapes may also be selected or defined, including for example an ellipse cross-section, a rectangle cross-section and the like.

As shown in FIG. 9B, TDE generator 110 may determine an overlapping volume (e.g., textured region in FIG. 9C) between first auxiliary mesh 110B and primary mesh 210. According to some embodiments, TDE generator 110 may create a second auxiliary mesh, 110C, corresponding to said overlapping volume. It may be appreciated that the second auxiliary mesh 110C may be calculated as an intersection of first auxiliary mesh 110B and primary mesh 210, and may thus be referred to as intersecting mesh 110C.

According to some embodiments, system 100 may include a mesh integrator module (e.g., element 130 of FIG. 2), adapted to integrate data pertaining to OMF 20 primary meshes 210 and/or auxiliary meshes (e.g., 110B, 110C) so as to prepare MMF 30.

For example, mesh integrator module 130 may assign at least one printing property (e.g., "Property-b", such as a specific color) and/or at least one printing priority (e.g., "Priority-b") to at least one auxiliary mesh (e.g., intersecting mesh 110C) data element. In another example, mesh integrator module 130 may assign at least one printing property (e.g., "Property-a") and/or at least one printing property (e.g., "Priority-b") to primary mesh 210 to produce at least one modified mesh data element 310.

According to some embodiments, mesh integrator module 130 may transfer said at least one modified mesh data element 310 and/or at least one auxiliary mesh data element as MMF 30 to 3D printer 40, which may in turn use MMF 30 to print a corresponding 3D object, according to the printing priorities and/or printing properties of each shell.

In other words, mesh integrator module 130 may attribute a first printing priority (e.g., "Priority-a") to a first mesh data element 310-1 and a second printing priority (e.g., "Priority-b") to a second mesh data element 310-2, so that, for instance, data pertaining to mesh data element 310-1 may have a printing priority over data pertaining to mesh element 310-2. In that way, when printing with printer 40, if at a specific spatial location there are two available values of printing properties (e.g., different colors) originating from both mesh data element 310-1 and mesh data element 310-2, then the data pertaining to mesh data element 310-1 may be prioritized and may be used for printing at this specific location. In some other cases, if the user does not wish to print emphasized line 110D at this specific location (e.g., by disabling this option via UI 120), then the printing priority order between mesh data elements 310-1 and 310-2 may be arranged such that mesh data element 310-1 will get a lower printing priority than mesh data element 310-2.

According to some embodiments, mesh integrator module 130 may assign a printing priority and/or a printing property to the entire volume of a mesh, thus enabling selection between two or more printing properties originating from two or more respective, overlapping meshes. Additionally, or alternatively, mesh integrator module 130 may apply a printing priority and/or a printing property to a surface of a mesh, thus enabling selection between two or more printing properties at the location of a surface or boundary of a mesh.

Additionally, or alternatively, mesh integrator module 130 may combine intersecting mesh 110C and primary mesh 210 to produce at least one modified mesh data element 310, and may include the produced modified mesh data element 310 in a mesh file, so as to create MMF 30.

For example, as depicted in the example of FIGS. 9D and 9E, mesh integrator module 130 may apply a first printing property (e.g., a first color) to intersecting mesh 110C that may be different from a second printing property (e.g., a second color) of primary mesh 210. Mesh integrator module 130 may include intersecting mesh 110C in a mesh data element 310 (e.g., 310-1), defining a volume of an emphasized target line 110D in MMF 30.

Additionally, or alternatively, mesh integrator module 130 may modify a property of a region of primary mesh 210 that is defined by the overlapping volume (e.g., intersecting mesh 110C), and may produce a modified mesh file 30 that may not include intersecting mesh 110C, but may instead include at least one mesh data element 310 (e.g., 310-2) that defines or represents the modified primary mesh 210.

According to some embodiments, mesh integrator module 130 may be configured to delete the first auxiliary mesh 110B, and/or not include auxiliary mesh 110B in MMF 30.

3D printer 40 may be configured to receive MMF 30 and print the 3D object based on, or utilizing the modified mesh file 30, so as to produce or print a 3D object that includes emphasized target line 110D, as defined by intersecting mesh 110C. In other words, in the example of FIG. 9A through FIG. 9E, target line 110A may be emphasized, so as to be attributed a volume, or thickness, defined by intersecting mesh 110C, and may thus be printed by a 3D printing machine 40 as part of a 3D object, originally defined by OMF 20.

Reference is now made to FIGS. 10A through 10D, which are schematic drawings, showing another example of a method of modifying a TDE, such as a target line in a mesh file, according to some embodiments of the invention. More specifically, FIG. 10A depicts an isometric view of a target line 110A; FIG. 10B depicts a side view of target line 110A with an enveloping auxiliary shell 110B; FIG. 10C depicts an intersecting shell 110C, which may define an overlapping volume between a primary shell 210 of OMF 20 and auxiliary shell 110B, according to some embodiments; and FIG. 10D depicts a definition of an emphasized target line 110D in an MMF 30, according to some embodiments.

It may be appreciated that FIGS. 10A through 10C may be substantially equivalent to respective FIGS. 9A through 9C of the previous example, and the description thereof will be omitted here for the purpose of brevity.

As shown in FIG. 10D, mesh integrator module 130 may modify a property of geometry of a region of primary mesh 210, near target line 110A. For example, mesh integrator module 130 may assign a "void property" to intersection mesh 110C, thus indicating that printing material should not be applied in the volume of mesh 110C (or indicating that support material should be applied there, instead). Thus, mesh integrator module 130 may omit a portion of primary mesh 210, creating a notch near target line 110A. The omitted portion may correspond to the overlapping volume (e.g., defined by intersection mesh 110C) of primary mesh 210. Mesh integrator module 130 may subsequently produce an MMF 30, that includes a mesh data element 310 that is a modified version (e.g., having a notch) of primary mesh 210.

As shown in FIG. 10D, mesh data element 310 may include a gap, a groove, or a notch in the spatial region defined by primary mesh 210. In other words, in the example of FIG. 10D, target line 110A may be emphasized by creating a groove (emphasized target line 110D) in the spatial region defined by primary mesh data element 210.

According to some embodiments, mesh integrator module 130 may modify OMF 20, so as to include the modified version (e.g., 310) of the at least one primary mesh data element 210, thus producing MMF 30. 3D printer 40 may be configured to receive MMF 30, and subsequently print a 3D object as defined by OMF 20, including the emphasized target line 110D (e.g., the groove), as defined by mesh data element 310.

As elaborated in the examples herein (e.g., in relation to FIGS. 9A through 9E and/or 9A through 9D), mesh integrator module 130 may combine intersecting mesh 110C and primary mesh 210 in a variety of ways.

For example (e.g., as in FIGS. 9A through 9E) mesh integrator module 130 may combine intersecting mesh 110C and primary mesh 210 as a superposition of primary mesh and the intersecting mesh. For example, mesh integrator module 130 may apply or receive (e.g., via UI 120) a first printing property (e.g., a first color, such as blue) to an intersecting mesh data element 110C (e.g., defining a spatial position of an emphasized target line 110D) and apply or receive (e.g., via UI 120) a second printing property (e.g., a second color, such as yellow) to primary mesh 210. Mesh integrator module 130 may combine intersecting mesh 110C and primary mesh 210 so as to produce a mesh data element 310 that may include a superposition of the one or more printing properties (e.g., superimposing blue and yellow to produce green) at the region of intersecting mesh 110C.

In another example, data from intersecting mesh 110C may be prioritized over data pertaining to primary mesh 210, to enable selection between printing properties, as elaborated herein.

In another example, mesh integrator module 130 may combine intersecting mesh 110C and primary mesh 210 so as to produce a mesh data element 310 that may include a gradual shift (e.g., a gradient) from a first printing property (e.g., the blue color) to a second property (e.g., the yellow color).

In another example (e.g., as depicted in FIGS. 10A through 10D) mesh integrator module 130 may combine intersecting mesh 110C and primary mesh 210 as a subtraction of the volume of intersecting mesh 110C from the volume of primary mesh 210.

It may be appreciated that embodiments of the invention may include additional implementations of combinations of intersecting mesh 110C and primary mesh 210.

Reference is now made to FIGS. 11A through 11C, which are schematic drawings, showing another example of a method of modifying a TDE 110, such as an overlapping volume, in a mesh file, according to some embodiments of the invention. More specifically, FIG. 11A depicts an isometric view of a 3D printing model that may be defined or described by OMF 20;

FIG. 11B depicts a schematic, side view of shells defined by primary mesh elements 210 of OMF 20, and describes stages of a method of identifying TDE 110 in OMF 20, according to some embodiments; and FIG. 11C depicts an isometric view of a 3D printing model that may be defined or described by MMF 30, according to some embodiments.

As shown in FIG. 11A, OMF 20 may include a plurality of primary mesh data elements 210, each defining a physical location or volume in a 3D space. As shown in FIG. 11A, two or more such primary mesh data elements 210 (e.g., 210-1, 210-2, defining the depicted cuboids and 210-3, defining a depicted sphere) may intersect, or have a common, intersection line.

According to some embodiments, system 100 may be configured to produce an emphasized TDE 110D based on an overlapping volume between primary shells 210. For example, as shown in FIG. 11A, a first primary mesh data element 210 (e.g., 210-1) may represent or describe a first spatial shell or volume (e.g., a first cuboid) and a second primary mesh data element 210 (e.g., 210-2) may represent or describe a second spatial shell (e.g., a second cuboid) that intersects with the first shell, thus creating an overlapping volume.

In this condition, it may be said that a distance (marked "d") between the shell of the first primary mesh data element 210-1 and the shell of the second primary mesh data element 210-2 is negative, at the region of the overlapping volume. A depiction of such overlapping volume, where distance d is negative may be seen in FIG. 11B, schematically depicting a side view of shells 210-1 and 210-2 of FIG. 11A.

According to some embodiments of the invention, TDE generator 110 may select a first primary mesh data element 210-1 representing a first shell (e.g., the first cuboid) and a at least one second primary mesh data element 210-2 representing at least one second shell (e.g., the second cuboid).

TDE generator 110 may identify a condition in which the first shell intersects with the second shell (e.g., distance "d" is negative). If the first primary mesh 210-1 intersects with the second primary mesh 210-2, TDE generator 110 may identify the overlapping volume, defined by the intersection of the first primary mesh 210-1 and the one or more second primary meshes 210-2, as TDE 110A or as belonging to TDE 110A.

As depicted in FIG. 11B, TDE generator 110 may produce an auxiliary mesh based on a geometry of said identified TDE 110A. For example, TDE generator 110 may produce an auxiliary mesh that is an intersection mesh 110C, as the intersection of the first primary mesh 210-1 and the one or more second primary meshes 210-2. In other words, auxiliary mesh (e.g., intersection mesh) 110C may define, surround or envelopes the overlapping volume (e.g., the region in which d<0) between the first primary shell 210-1 and the one or more second primary shells 210-2.

According to some embodiments, mesh integrator module 130 may utilize intersection mesh 110C to produce an emphasized TDE 110D. For example, as depicted in FIG. 11B, mesh integrator module 130 may identify the volume defined by intersection mesh 110C as an emphasized TDE 110D. Mesh integrator module 130 may subsequently produce an MMF 30 that may include intersection mesh 110C as a mesh data element 310 (e.g., 310-3). Mesh integrator module 130 may include in MMF 30 at least one printing attribute and/or printing property (e.g., a color) of intersection mesh 110C (e.g., defining emphasized TDE 110D) as elaborated herein (e.g., in relation to FIGS. 9A through 9E).

Additionally, or alternatively, mesh integrator module 130 may include in MMF 30 one or more mesh data elements 310 (e.g., 310-1, 310-2) that may be modified versions of original, primary mesh data elements 210 (e.g., 210-1, 210-2, respectively), as elaborated herein (e.g., in relation to FIGS. 9A through 9E).

Additionally, or alternatively, mesh integrator module 130 may attribute a first printing priority to mesh data element 310-1, a second printing priority to mesh data element 310-2, and a third printing priority to mesh data element 310-3 (e.g., identical to intersection mesh 110C), so that, for instance, data pertaining to mesh data element 310-3 may have a printing priority over data pertaining to mesh data elements 310-1 and 310-2. In that way, when printing with printer 40, if at a specific spatial location there are two or more available printing data originating from mesh data elements 310-1, 310-2 and 310-3, then the data pertaining to mesh data element 310-3 may be prioritized and may be used for printing at this specific location resulting in emphasized line 110D.

Additionally, or alternatively, a user may indicate that they do not wish to print emphasized TDE 110D at this specific location (e.g., by disabling this option via UI 120). In this condition, the printing priority order between mesh data elements 310-1, 310-2 and 310-3 may be arranged such that mesh data element 310-3 will get the lowest printing priority.

According to some embodiments, 3D printer 40 may thus be configured to receive MMF 30 file and utilize it to print a 3D object, based on or as defined by OMF 20, with emphasized TDE 110D, as elaborated herein (e.g., in relation to FIGS. 9A through 9E).

As elaborated herein, TDE generator 110 may identify one or more TDEs 110A that are parting target lines 110A, defining a partition or gap between one or more polygons of one or more respective 3D meshes. For example, in a condition that a distance (marked 'd') between first primary shell 210-1 and the one or more second primary shells 210-2 is 0, the primary shells may be referred to as having a common border or partition. In this condition, TDE generator 110 may identify a polygon of the first primary shell and a polygon of the at least one second primary shell, having a common polygon edge line. TDE generator 110 may then accumulate one or more such polygon edge lines to create a TDE 110A that is shaped as a continuous line, as elaborated herein (e.g., in relation to FIG. 7D). Additionally, or alternatively, TDE generator 110 may create an emphasized TDE 110D, based on the identified partition line 110A, as elaborated herein (e.g., in relation to FIG. 9E and/or FIG. 10D), and include data pertaining to emphasized TDE 110D in MMF 30, as elaborated herein.

Reference is now made to FIGS. 12A through 12C, which are schematic drawings, showing another example of a method of identifying a TDE 110A, such as a gap or a partition between meshes line in a mesh file, according to some embodiments. More specifically, FIG. 12A depicts an isometric view of a 3D printing model that may be defined or described by OMF 20; FIG. 12B depicts a schematic, side view of primary meshes defined by primary mesh elements 210 of OMF 20, and describes stages of a method of identifying and modifying a TDE 110A in a mesh file, according to some embodiments; and FIG. 12C depicts an isometric view of a 3D printing model that may be defined or described by a MMF 30, according to some embodiments.

In the example depicted in FIGS. 12A through 12C, OMF 20 may include a first primary mesh data element 210 (e.g., 210-1) representing a first shell (e.g., a first cuboid) and at least one second primary mesh data element 210 (e.g., 210-2) representing a second shell (e.g., a second cuboid). As shown in the schematic, isometric view of FIG. 12A, and in the schematic side view of FIG. 12B, the first shell of primary mesh data element 210-1 and the second shell of primary mesh data element 210-2 are located at a distance (marked "d") that may be equal to, or larger than 0.

According to some embodiments of the invention, TDE generator 110 may select a first primary mesh (e.g., 210-1, representing the first shell) and select at least one second primary mesh (e.g., 210-2, representing the second shell), where the at least one second primary mesh 210-2 is located at a distance (e.g., marked "d") from the first primary mesh 210-1, and that distance is smaller than a predefined threshold (e.g., marked as "D", d<D). In this condition, TDE generator 110 may identify one or more TDEs 110A based on the geometry of the first primary mesh 210-1 and the at least one second primary mesh 210-2 and the gap therebetween.

For example, TDE generator 110 may produce a first auxiliary mesh data element 110B-1, representing a physical location of an equidistant auxiliary shell or envelope, surrounding or enveloping the shell of first primary mesh data element 210-1, as depicted in FIG. 12B. In a similar manner, TDE generator 110 may produce a second auxiliary mesh data element 110B-2, representing a physical location of a second equidistant auxiliary shell or envelope, surrounding or enveloping the shell of second primary mesh data element 210-2, as depicted in FIG. 12B. It may be appreciated that auxiliary meshes 110B-1 and 110B-2 may be located at an offset from their respective meshes (e.g., 210-1 and 210-2) and may thus be referred to as offset auxiliary shells.

According to some embodiments, TDE generator 110 may identify a first volume, Vol1 defined by the intersection of the first primary mesh 210-1 and the second offset mesh 110B-2 and identify a second volume, Vol2, defined by the intersection of the second primary mesh 210-1 and the first offset mesh 110B-1. TDE generator 110 may subsequently identify a unified volume that may include the first volume Vol1 and the second volume Vol2 as TDE 110A or as belonging to the TDE 110A.

According to some embodiments, TDE generator 110 may produce an auxiliary mesh (e.g., a union mesh) 310-3, enveloping the unified volume (e.g., enveloping Vol1 and Vol2). Mesh integrator 130 may then include auxiliary union mesh 310-3 in MMF 30, and 3D printer 40 may be adapted to print a 3D object using MMF 30 as elaborated herein.

Additionally, or alternatively, TDE generator 110 may produce at least one intersection mesh data element 110C (e.g., elements 110C-1, 110C-2 and 110C-3), that define a volume or shape of TDE 110A. For example, TDE generator 110 may produce an intersection mesh data element 110C-1 defining or enveloping a volume of overlap between the first auxiliary shell (defined by the first auxiliary mesh data element 110B-1) and the auxiliary shell (defined by the second auxiliary mesh data element 110B-2). TDE generator 110 may then produce: (a) an intersection mesh data element 110C-2 defining or enveloping a volume of overlap between the shell of the first primary mesh data element 210-1 and intersection mesh data element 110C-1, and (b) an intersection mesh data element 110C-3 defining or enveloping a volume of overlap between the shell of second primary mesh data element 210-2 and intersection mesh data element 110C-1. In some embodiments, TDE generator 110 may unify intersection mesh data element 110C-2 and intersection mesh data element 110C-3 to generate union mesh 310-3.

According to some embodiments, mesh integrator module 130 may subsequently produce a MMF 30 that may include mesh data elements 310-1 and 310-2 (corresponding to mesh data elements 210-1 and 210-2 of OMF 20, respectively) and mesh data element 310-3, based on at least one intersection mesh data element 110C. For example mesh data element 310-3 may include a representation of a shell and/or volume of one or more intersection mesh elements 110C, including for example elements 110C-1, 110C-2, 110C-3, and/or any combination (e.g., a union, an intersection) thereof. Mesh integrator module 130 may include in MMF 30 at least one printing attribute or property (e.g., a color) of the at least one mesh data element 310-3, so as to define an emphasized TDE 110D, as elaborated herein.

Additionally, mesh integrator module 130 may attribute a first printing priority to mesh data element 310-1, a second printing priority to mesh data element 310-2, and a third printing priority to mesh data element 310-3, so that, for instance, data pertaining to mesh data element 310-3 may have a printing priority over data pertaining to mesh data elements 310-1 and 310-2. In that way, when printing with printer 40, if at a specific spatial location there are two or more available printing data originating from mesh data elements 310-1, 310-2 and 310-3, then the data pertaining to mesh data element 310-3 may be prioritized and be used for printing at this specific location resulting in emphasized line 110D.

Additionally, or alternatively, a user may indicate that they do not wish to print emphasized TDE 110D at this specific location (e.g., by disabling this option via UI 120). In this condition, the printing priority order between mesh data elements 310-1, 310-2 and 310-3 may be arranged such that mesh data element 310-3 will get the lowest printing priority.

Figure 13:
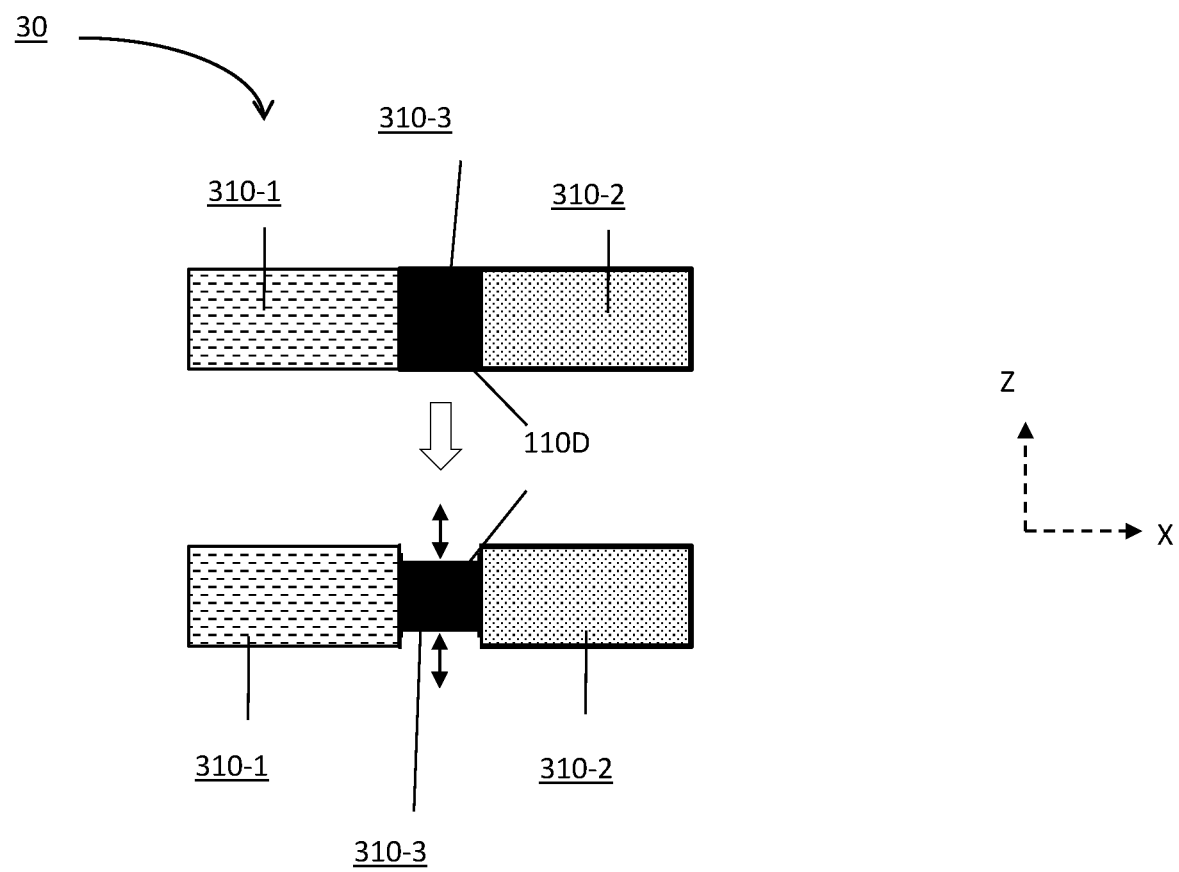
FIG. 13 is a schematic drawing, showing another example of a method for modifying a TDE, such as an overlapping volume, in a mesh file, according to some embodiments of the invention.

Reference is now made to FIG. 13, which depicts a schematic, side view of shells that may be defined by mesh data elements 310 of MMF 30, according to some embodiments of the invention. In the present case, MMF 30 may include mesh data elements 310-1, 310-2 and 310-3, wherein mesh data element 310-3 may represent an emphasized TDE 110D. Mesh integrator module 130 may modify the size and/or shape of mesh data element 310-3 in order to create an "emboss" or "notch" effect at the location of emphasized target line 110D. This can be done instead or in addition to the allocation by mesh integrator module 130 of a printing attribute or property and/or a printing priority to mesh data element 310-3.

Reference is now made to FIGS. 14A through 14F, which are schematic drawings, showing another example of a method of modifying a TDE, such as a region of a 2D surface in a mesh file, according to some embodiments of the invention. More specifically, FIG. 14A depicts a top view of a 3D printing model or object that may be defined or described by OMF 20 according to some embodiments. In the example of FIG. 14A, OMF 20 may include two primary mesh data elements 210 (e.g., 210-1 and 210-2), corresponding to or describing respective shells of the 3D model or object. In the present example, mesh data element 210-2 may represent a geometric location of a two-dimensional element (e.g., a "sticker" or a "decal") which may be a flat surface, having zero thickness. For example, mesh data element 210-2 may represent a picture or a design element, which may be placed on (e.g., on top of) a surface of mesh data element 210-1 (e.g., a cuboid). FIGS. 14B through 14D depict a side view of the 3D printing model of OMF 20, along intersection view line A-A. FIG. 14E depicts a side view of the 3D model as defined by a modified mesh file 30, so as to include at least one emphasized target line 110D. FIG. 14F depicts a top view of the 3D printing model as defined by MMF 30.

As shown in FIG. 14C, TDE generator 110 may produce an auxiliary shell data element 110B, defining or representing a shell that equidistantly envelopes a shell of at least one primary mesh data element 210 (e.g., 210-2). As shown in FIG. 14C, TDE generator 110 may produce an intersection mesh element 110C defining an overlapping volume between the shell or volume defined by first primary mesh data element 210-1 and auxiliary shell data element 110B.

As shown in FIGS. 14E and 14F (on a schematic intersection side view and a schematic top view respectively), mesh integrator module 130 may produce MMF 30 that may include at least one mesh data element 310 (e.g., elements 310-1, 310-2, 310-3).

For example, mesh data elements 310-1 and 310-2 may be based upon primary mesh elements 210-1 and 210-2 respectively, representing spatial positions of shells of the 3D model or object, as defined by OFM 20 as elaborated herein (e.g., in relation to FIGS. 9A through 9E).

Additionally, at least one mesh data element 310 (e.g., element 310-3) may be based on intersection mesh 110C data element: mesh data element 310-3 may include a representation of a shell and/or volume of intersection mesh elements 110C, thus including or defining an overlapping volume between an auxiliary mesh (e.g., 110B) and a primary mesh 210 (e.g., 210-1) of OFM 20. Mesh integrator module 130 may include in MMF 30 at least one printing attribute or property (e.g., a color) of mesh data element 310-3, so as to define an emphasized TDE 110D.

Furthermore, mesh integrator module 130 may attribute a first printing priority to mesh data element 310-1, a second printing priority to mesh data element 310-2, and a third data priority to mesh data element 310-3, so that, for instance, data pertaining to mesh data element 310-3 have a printing priority over data pertaining to mesh data elements 310-1 and 310-2. In that way, when printing with printer 40, if at a specific spatial location there are available printing data originating from mesh data element 310-3 and also from mesh data element 310-1 (or 310-2), then the data pertaining to mesh data element 310-3 will be prioritized and used for printing at this specific location. Additionally, a user may indicate that they do not wish to print emphasized TDE 110D at this specific location (e.g., by disabling this option via UI 120). In this condition, then the printing priority order between mesh data elements 310-1, 310-2 and 310-3 may be arranged such that mesh data element 310-3 will get a lower printing priority.

Figure 15A:
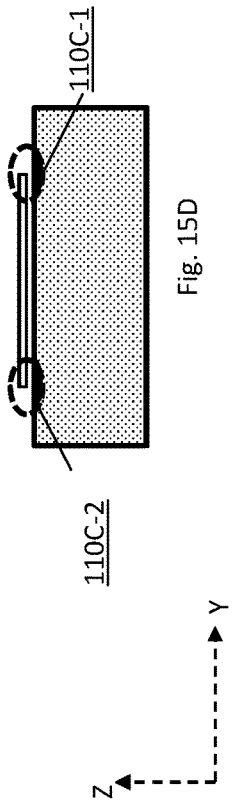
FIGS. 15A through 15F are schematic drawings, showing another example of a method of modifying a TDE, such as a region of a 2D surface in a mesh file, according to some embodiments of the invention.
Figure 15B:
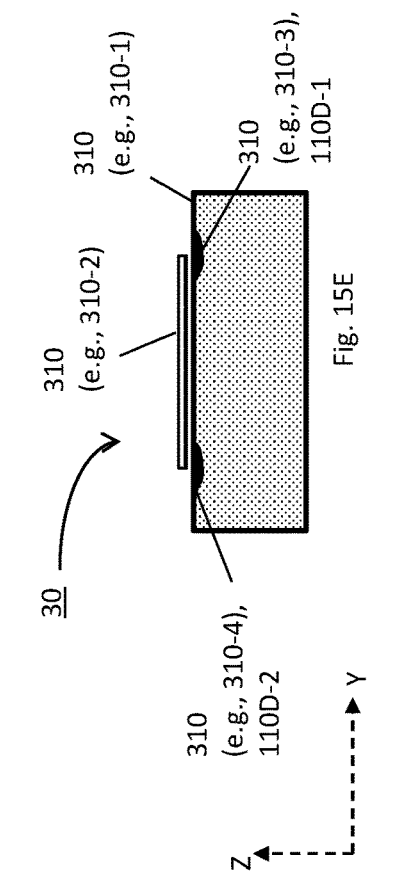
Figure 15C:
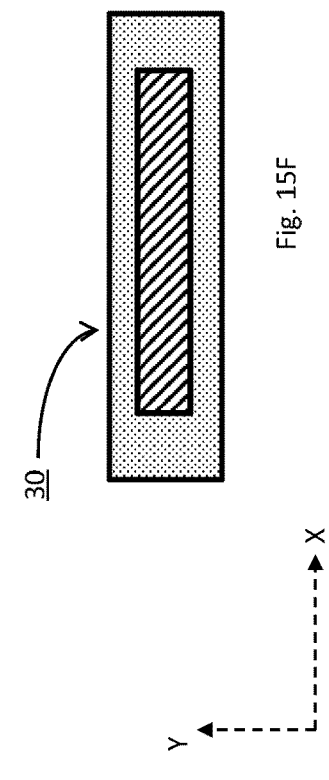
Figure 15D:
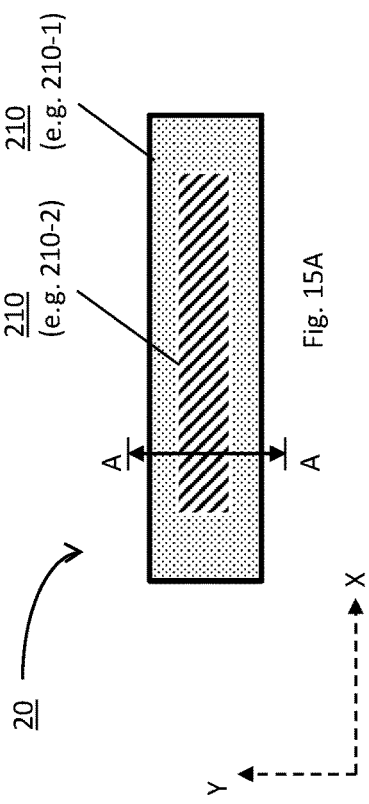
Figure 15E:
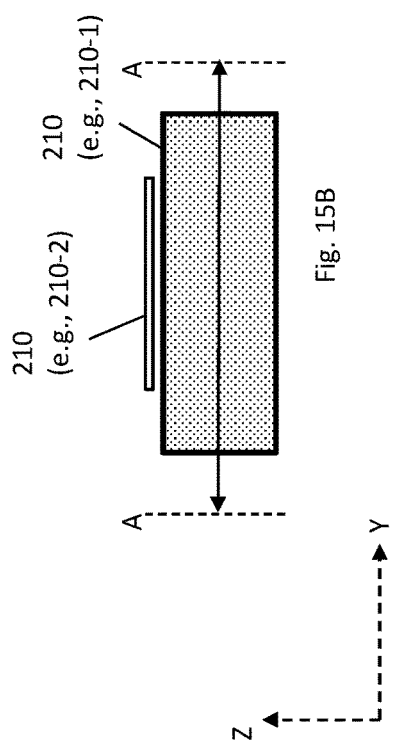
Figure 15F:
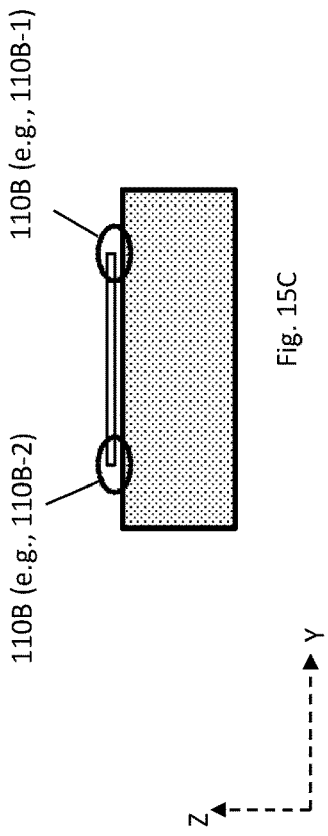

Reference is now made to FIGS. 15A through 15F, which showing another example of a method of modifying a TDE, such as a region of a 2D surface in a mesh file, according to some embodiments of the invention. More specifically, FIG. 15A depicts a top view of a 3D printing model or object that may be defined or described by OMF 20 according to some embodiments. In the example of FIG. 15A, OMF 20 may include two primary mesh data elements 210 (e.g., 210-1 and 210-2), corresponding to or describing respective shells of the 3D model or object. In the present example, mesh data element 210-2 may represent a 2D element (e.g., a flat surface), such as a "sticker" or a "decal", having zero thickness. For example, mesh data element 210-2 may representing a picture or design element, which is placed on top of a surface of mesh data element 210-1 (e.g., a cuboid). FIGS. 15B through 15D depict a side view of the 3D printing model of OMF 20, along intersection viewing line A-A. FIG. 15E depicts a side view of the 3D model as defined by a modified mesh file 30, so as to include at least one emphasized target line 110D. FIG. 15F depicts a top view of the 3D printing model as defined by MMF 30.

It may be appreciated that the example of the method of identifying a target line in a mesh file, as depicted in the example of FIGS. 15A-15F is substantially similar to that described in relation to the previous example of FIGS. 14A-14F. Therefore much of the discussion corresponding to the present example of FIGS. 15A-15F may be omitted here for the purpose of brevity. A difference between the present example of FIGS. 15A-15F and the previous example of FIGS. 14A-14F may be found in the shape and/or quantity of one or more auxiliary meshes 110B: in the present example of FIG. 15A through FIG. 15F, the auxiliary mesh may be applied on one or more regions or edges of primary mesh data element 210-2. For example, an auxiliary mesh 110B may be centered on an edge of mesh data element 210-2). Consequently, a subsequent intersecting mesh data element 110C (e.g., 110C-1 and 110C-2) may correspond to, or follow edges of the shell of primary mesh data element 210-2, overlapping with the shell of primary mesh data element 210-1 (e.g., as shown in FIG. 15D and FIG. 15E). Thus, MMF 30 may include at least one emphasized TDE 110D (e.g., target line 110D-1 and target line 110D-2) that follows an edge of the shell of primary mesh data element 210-2 and overlaps with the shell of primary mesh data element 210-1.

In a similar manner to the example shown in FIGS. 14A-14F, in the present case, at least one mesh data element 310 (e.g., 310-3 and 310-4) may be based on an intersection mesh 110C data element (e.g., 110C-1 and 110C-2): mesh data elements 310-3 and 310-4 may include a representation of a shell and/or a volume of intersection mesh elements 110C. Mesh integrator module 130 may include in MMF 30 at least one printing attribute or property (e.g., a color) of mesh data element 310-3 and 310-4, so as to define emphasized TDE 110D (e.g., target lines 110D-1 and 110D-2). Furthermore, mesh integrator module 130 may attribute a printing priority to each one of mesh data element 310-1, 310-2, 310-3 and 310-4, for the purpose described herein (e.g., in relation to the example shown in FIG. 14A through FIG. 14F).

Figure 16B:
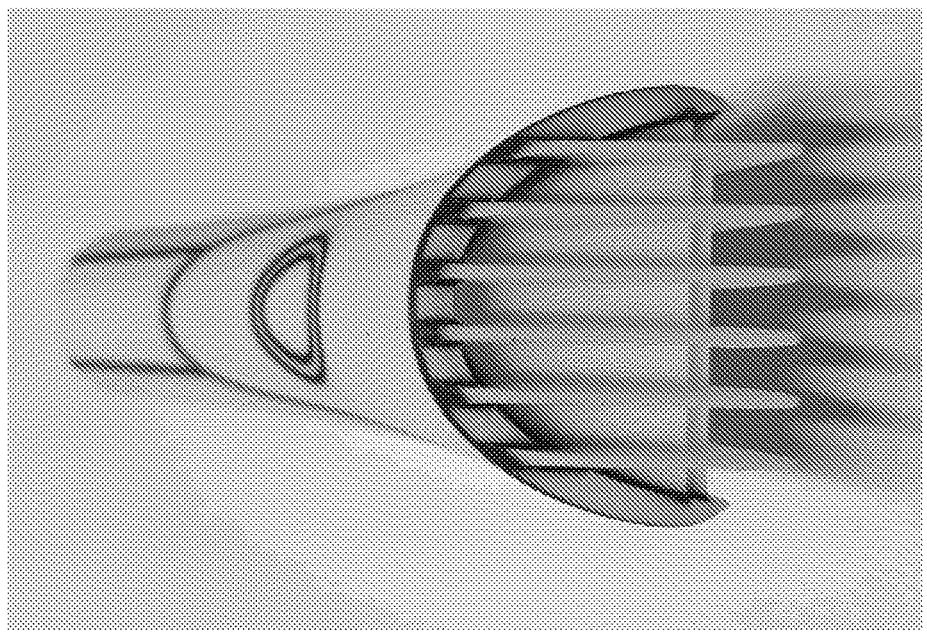
FIGS. 16A and 16B respectively show a representation of a mesh file of a 3D model and the corresponding 3D printed object having emphasized design lines, according to some embodiments of the invention.
Figure 16A:
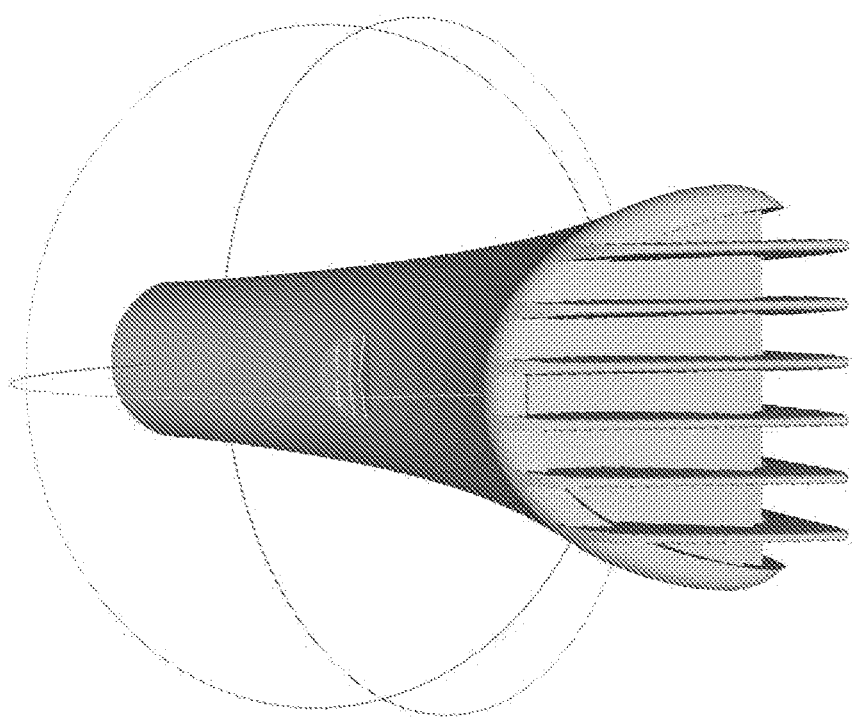

Reference is now made to FIGS. 16A and 16B, which respectively show a representation of a 3D object and a printed 3D object including a plurality of emphasized design elements (e.g., design lines).

As shown in FIG. 16A, the 3D object (e.g., a hair cutting machine) may be originally represented by a single-color 3D mesh file 20 or model file, as elaborated herein. As known in the art, commercially available 3D printing systems may produce, by a 3D printer, a single color 3D object based on the 3D model file.

In contrast, and as shown in FIG. 16B, embodiments of the invention may be adapted to produce, from the same single-color mesh file 20 or model file, a modified mesh file 30, and utilize MMF 30 to print a 3D object that may include a visually explicit representation or an emphasis (e.g., by color, by texture, by local changes in geometry, etc.) of design elements (e.g., TDE 110A, such as lines) that are implicitly included in the original model file 20. The design elements may be referred to as implicit in a sense that they may not visible to a human observer, although they may exist in OMF 20. The emphasized lines or regions of TDE 110D may be seen as dark lines or regions in FIG. 16B.

Figure 17:
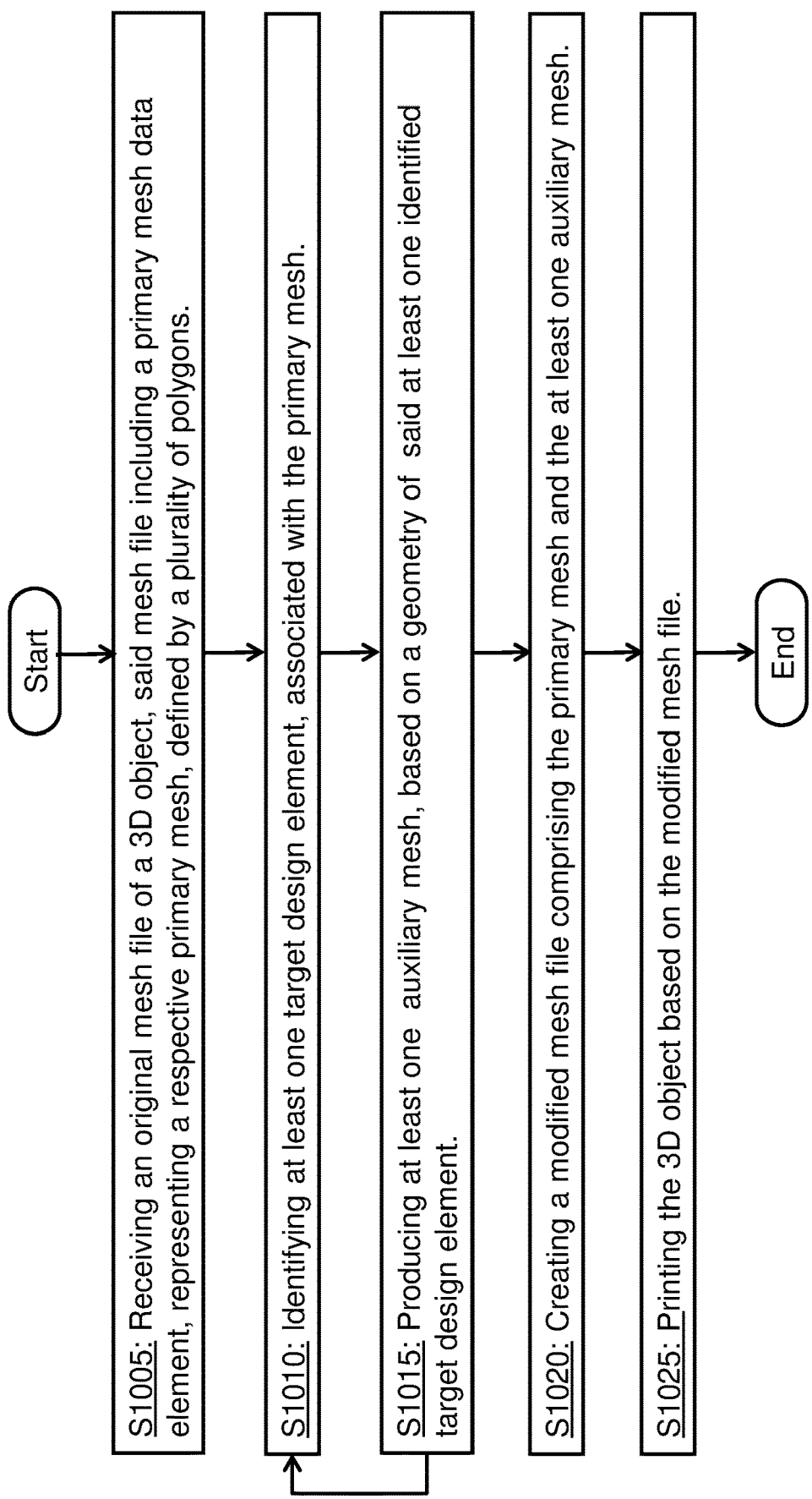
FIG. 17 is a flow diagram, depicting a method of printing a 3D object that may include one or more emphasized wireframe lines, according to some embodiments of the invention.

Reference is now made to FIG. 17, which is a flow diagram, depicting a method of printing a 3D, according to some embodiments of the invention by at least on processor (e.g., element 2 of FIG. 1).

As shown in step S1005, the at least one processor may receive an original mesh file (e.g., element 20 of FIG. 2) of a 3D object. OMF 20 may include a primary mesh data element (e.g., element 210 of FIG. 2), representing a respective primary mesh, defined by a plurality of polygons (elements 220 of FIG. 2).

As shown in step S1010, the at least one processor may identify at least one target design element (e.g., TDE element 110A), associated with, or included in primary mesh 210, as elaborated herein.

As shown in step S1015, the at least one processor may produce at least one auxiliary mesh (e.g., element 110C of FIG. 9E), based on a geometry of said at least one identified TDE 110A. Embodiments of the invention may perform steps S1010 and S1015 repeatedly, to identify a plurality of TDEs 110A and produce a plurality of auxiliary mesh data elements.

As shown in step S1020, the at least one processor may create a modified mesh file (e.g., element 30 of FIG. 2) that may include primary mesh data element 210 and/or a modified version thereof, and the at least one auxiliary mesh data element (e.g., element 110C).

As shown in step S1025, the at least one processor may utilize MMF 30 on a 3D printer or printing machine, to print the 3D object based on the modified mesh file 30.

Embodiments of the invention may include a practical application for enhancing a process of 3D printing. Embodiments of the invention may provide an improvement over currently available 3D printing technology by enabling a user to print design elements that are implicitly (e.g., invisibly) included in a mesh file or a 3D CAD file, so that those elements would be emphasized, or made discernable to a human viewer on a 3D printed object. Examples for a plurality of methods for emphasizing design elements are brought throughout this document. It may be appreciated by a person skilled in the art that additional such methods may also be possible.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of printing a three-dimensional (3D) object, the method comprising:
   receiving an original mesh file of a 3D object, said mesh file comprising at least a first primary mesh data element and a second primary mesh data element, each of said primary mesh data elements representing a distinct primary mesh, defined by a plurality of polygons;
   identifying at least one target design element, associated with any of said primary mesh data elements;
   producing at least one auxiliary mesh data element, based on a geometry of said at least one identified target design element;
   creating a modified mesh file comprising the primary mesh data element associated with said at least one identified target design element and the at least one auxiliary mesh data element; and
   printing the 3D object based on the modified mesh file,
   wherein identifying a target design element comprises:
     selecting a first polygon of the first primary mesh data element;
     selecting a second polygon of the second primary mesh data element, wherein the face of the second polygon intersects with the face of the first polygon at a polygon intersection line;
     determining a first normal vector of the first polygon;
     determining a second normal vector of the second polygon;
     calculating an angle between the first normal vector and the second normal vector; and
     if said angle exceeds a predefined threshold, then identifying the polygon intersection line as belonging to a target design element.

2. The method of claim 1, further comprising assigning a first printing priority to the first primary mesh data element and/or the second primary mesh data element, and a second printing priority to the at least one auxiliary mesh data element, and printing the 3D object according to said printing priorities.

3. The method of claim 1, further comprising assigning a printing property to the at least one auxiliary mesh data element and printing the 3D object according to said printing property.

4. The method of claim 3, wherein the printing property of the auxiliary mesh data element is selected from a list consisting of: a color, a texture, a printing material, a mechanical property, a void property, and any combination thereof.

5. The method of claim 1, wherein said target design element is a target line, and wherein said target line is selected from a list consisting of: an edge line, a parting line, a contour line, an intersecting line and a tangent line.

6. The method of claim 5 wherein producing an auxiliary mesh data element, based on a geometry of the target line comprises:
   creating a first auxiliary mesh data element, enveloping at least a portion of the target line; and
   creating a second auxiliary mesh data element, corresponding to an overlapping volume between the first auxiliary mesh data element and the first and/or second primary mesh data elements.

7. The method of claim 6, further comprising deleting said first auxiliary mesh data element.

8. The method of claim 6, wherein creating a modified mesh file comprises:
   assigning at least one printing property to the second auxiliary mesh data element;
   assigning a first printing priority to the first and/or second primary mesh data elements;
   assigning a second printing priority to the auxiliary mesh data element, so that printing of the second auxiliary mesh data element is prioritized over printing of the first and/or second primary mesh data elements; and including said second auxiliary mesh data element and said first and/or second primary mesh data elements in the modified mesh file.

9. The method of claim 1, wherein identifying the target design element comprises identifying a polygon of the first primary mesh data element and a polygon of the second primary mesh data element having a common polygon edge line.

10. A system for printing a 3D object, the system comprising:
    a non-transitory memory device, wherein modules of instruction code are stored, and
    a processor associated with the memory device, and configured to execute the modules of instruction code, whereupon execution of said modules of instruction code, the processor is configured to implement the method of printing a 3D object of claim 1.

11. A method of printing a three-dimensional (3D) object, the method comprising:
    receiving an original mesh file of a 3D object, said mesh file comprising a primary mesh data element, representing a respective primary mesh, defined by a plurality of polygons;
    identifying at least one target design element, associated with the primary mesh data element;
    producing at least one auxiliary mesh data element, based on a geometry of said at least one identified target design element;
    creating a modified mesh file comprising the primary mesh data element and the at least one auxiliary mesh data element; and
    printing the 3D object based on the modified mesh file,
    wherein identifying a target design element associated with a primary mesh data element comprises:
        selecting a first polygon of the primary mesh data element;
        selecting a second polygon of the primary mesh data element, said second polygon having a common polygon edge line with said first polygon;
        determining a first normal vector of said first polygon;
        determining a second normal vector of said second polygon;
        calculating an angle between the first normal vector and the second normal vector; and
        if said angle exceeds a predefined threshold, identifying said common polygon edge line as belonging to the target design element,
        wherein identifying a target design element associated with the primary mesh data element further comprises combining two or more common polygon edge lines to form a design element having a shape of a continuous line.

12. A method of printing a three-dimensional (3D) object, the method comprising:
    receiving an original mesh file of a 3D object, said mesh file comprising at least a first primary mesh data element and a second primary mesh data element, each of said primary mesh data elements representing a distinct primary mesh, defined by a plurality of polygons;
    identifying at least one target design element, associated with the primary mesh data element;
    producing at least one auxiliary mesh data element, based on a geometry of said at least one identified target design element;
    creating a modified mesh file comprising the primary mesh data element and the at least one auxiliary mesh data element; and
    printing the 3D object based on the modified mesh file,
    wherein identifying a target design element comprises:
        selecting a first primary mesh data element;
        selecting a second primary mesh data element, located at a distance that is smaller than a predefined threshold from the first primary mesh data element;
        producing a first offset mesh enveloping the first primary mesh data element;
        producing a second offset mesh enveloping the second primary mesh data element;
        identifying a first volume, defined by the intersection of the first primary mesh data element and the second offset mesh;
        identifying a second volume, defined by the intersection of the second primary mesh data element and the first offset mesh; and
        identifying a unified volume, comprising the first volume and the second volume as belonging to a target design element.

13. A system for printing a 3D object, the system comprising:
    a non-transitory memory device, wherein modules of instruction code are stored, and
    a processor associated with the memory device, and configured to execute the modules of instruction code, whereupon execution of said modules of instruction code, the processor is configured to implement the method of printing a 3D object of claim 12.

* * * * *